US006944853B2

(12) United States Patent
Topham

(10) Patent No.: US 6,944,853 B2
(45) Date of Patent: Sep. 13, 2005

(54) PREDICATED EXECUTION OF INSTRUCTIONS IN PROCESSORS

(75) Inventor: Nigel Peter Topham, Finchampstead (GB)

(73) Assignee: PTS Corporation, San Jose, CA (US)

( * ) Notice: Subject to any disclaimer, the term of this patent is extended or adjusted under 35 U.S.C. 154(b) by 787 days.

(21) Appl. No.: 09/862,547

(22) Filed: May 22, 2001

(65) Prior Publication Data

US 2002/0091996 A1 Jul. 11, 2002

(30) Foreign Application Priority Data

Jun. 13, 2000 (GB) .............................................. 0014432

(51) Int. Cl.⁷ ................................................ G06F 9/45
(52) U.S. Cl. ...................... 717/158; 717/149; 712/221
(58) Field of Search ................................ 717/158, 140, 717/149, 148

(56) References Cited

U.S. PATENT DOCUMENTS

| | | | | |
|---|---|---|---|---|
| 5,748,936 A | * | 5/1998 | Karp et al. ................. | 712/218 |
| 5,826,070 A | | 10/1998 | Olson et al. | |
| 5,859,999 A | * | 1/1999 | Morris et al. ............... | 712/224 |
| 5,958,048 A | * | 9/1999 | Babaian et al. ............. | 712/241 |
| 6,286,135 B1 | * | 9/2001 | Santhanam ................. | 717/146 |
| 6,301,705 B1 | * | 10/2001 | Doshi et al. ................ | 717/154 |
| 6,338,137 B1 | * | 1/2002 | Shiell et al. ................ | 712/225 |
| 6,505,345 B1 | * | 1/2003 | Chen et al. ................. | 717/154 |
| 6,598,155 B1 | * | 7/2003 | Ganapathy et al. ......... | 712/241 |
| 6,637,026 B1 | * | 10/2003 | Chen .......................... | 717/151 |
| 6,658,471 B1 | * | 12/2003 | Berry et al. ................ | 709/224 |
| 6,721,875 B1 | * | 4/2004 | McCormick et al. ....... | 712/233 |
| 6,772,106 B1 | * | 8/2004 | Mahlke et al. ............. | 703/21 |

FOREIGN PATENT DOCUMENTS

| WO | WO 94/16384 | 7/1994 |
|---|---|---|
| WO | WO 95/27247 | 10/1995 |

OTHER PUBLICATIONS

Eichenberger et al., Register alloaction for predicated code, IEEE, pp 180–191, 1995.*
Gillies et al, Global Predicate analysis and its application to register allocation, IEEE, pp 114–125, 1996.*
Jacome et al, Clustered VLIW architecture with predicted switching, ACM DAC, pp 696–701, Jun., 2001*

* cited by examiner

Primary Examiner—Anil Khatri
(74) Attorney, Agent, or Firm—Greer, Burns & Crain, Ltd.

(57) ABSTRACT

A processor includes a series of predicate registers 135. Each predicate register is switchable between at least respective first and second states and each is assignable to one or more predicated-execution instructions. A control information holding unit 131 holds items of control information which correspond respectively to the predicate registers. An operating unit 133 is provided for each one of the predicate registers and receives items of control information $L_i$ and $L_{i+1}$ and items of state information $P_i$, $P_{i-1}$. Each operating unit is operable to perform a selected state determining operation in which the state of its own predicate register is determined in dependence upon the received items. The operating units operate in parallel with one another to perform respective such state determining operations. The state determining operations can be used to bring about state changes required in prologue, kernel and epilogue stages of a software-pipelined loop.

23 Claims, 18 Drawing Sheets

| Stage | Cycle | Issue slot 1 | Issue slot 2 | Issue slot 3 | v0 | v1 | v2 | v3 |
|---|---|---|---|---|---|---|---|---|
| 1 | 0 | ld v0, (r0++) | | | s0 | | | |
|   | 1 | | | | s0 | | | |
| 2 | 2 | | | mul v1, v0, r1 | s1 | s2 | | |
|   | 3 | ld v2, (r2++) | | | | s2 | | |
| 3 | 4 | | | | | s3 | s4 | |
|   | 5 | | | add v3, v1, v2 | | s3 | s5 | s6 |
| 4 | 6 | | | | | | s5 | s7 |
|   | 7 | | | | | | | s7 |
| 5 | 8 | | | | | | | s8 |
|   | 9 | | st v3, (r3++) | | | | | s8 |

| Cycle | Offset | Iteration 0 | | | | | Instruction | Iteration 1 | | | |
|---|---|---|---|---|---|---|---|---|---|---|---|
| | | Instruction | v0 | v1 | v2 | v3 | | v0 | v1 | v2 | v3 |
| 0 | 6 | ld v0, (r0++) | r4 (→p10) | | | | | | | | |
| 1 | 6 | | r4 (→p10) | | | | | | | | |
| 2 | 5 | mul v1, v0, r1 | r5 (→p10) | r6 (→p11) | | | ld v0, (r0 ++) | r4 (→p9) | | | |
| 3 | 5 | ld v2, (r2++) | | r6 (→p11) | r8 (→p13) | | | r4 (→p9) | | | |
| 4 | 4 | | | r7 (→p11) | r9 (→p13) | | mul v1, v0, r1 | r5 (→p9) | r6 (→p10) | | |
| 5 | 4 | add v3, v1, v2 | | r7 (→p11) | r9 (→p13) | r10 (→p14) | ld v2, (r2++) | | r6 (→p10) | r8 (→p12) | |
| 6 | 3 | | | | | r11 (→p14) | | | r7 (→p10) | r9 (→p12) | |
| 7 | 3 | | | | | r11 (→p14) | add v3, v1, v2 | | r7 (→p10) | r9 (→p12) | r10 (→p13) |
| 8 | 2 | | | | | r12 (→p14) | | | | | r11 (→p13) |
| 9 | 2 | st v3, (r3++) | | | | r12 (→p14) | | | | | r11 (→p13) |
| 10 | 1 | | | | | | | | | | r12 (→p13) |
| 11 | 1 | | | | | | st v3, (r3++) | | | | r12 (→p13) |

| Cycle | Offset | Instruction | Iteration 2 v0 | v1 | v2 | v3 | Instruction | Iteration 3 v0 | v1 | v2 | v3 |
|---|---|---|---|---|---|---|---|---|---|---|---|
| 0 | 6 | | | | | | | | | | |
| 1 | 6 | | | | | | | | | | |
| 2 | 5 | | | | | | | | | | |
| 3 | 5 | | | | | | | | | | |
| 4 | 4 | ld v0, (r0++) | r4 (← p8) | | | | | | | | |
| 5 | 4 | | r4 (← p8) | | | | | | | | |
| 6 | 3 | mul v1, v0, r1 | r5 (← p8) | r6 (← p9) | | | ld v0, (r0 ++) | r4 (← p7) | | | |
| 7 | 3 | ld v2, (r2++) | | r6 (← p9) | r8 (← p11) | | | r4 (← p7) | | | |
| 8 | 2 | | | r7 (← p9) | r9 (← p11) | | mul v1, v0, r1 | r5 (← p7) | r6 (← p8) | | |
| 9 | 2 | add v3, v1, v2 | | r7 (← p9) | r9 (← p11) | r10 (← p12) | ld v2, (r2++) | | r6 (← p8) | r8 (← p10) | |
| 10 | 1 | | | | | r11 (← p12) | | | r7 (← p8) | r9 (← p10) | |
| 11 | 1 | | | | | r11 (← p12) | add v3, v1, v2 | | r7 (← p8) | r9 (← p10) | r10 (← p11) |
| 12 | 0 | | | | | r12 (← p12) | | | | | r11 (← p11) |
| 13 | 0 | st v3, (r3++) | | | | r12 (← p12) | | | | | r11 (← p11) |
| 14 | -1 | | | | | | | | | | r12 (← p11) |
| 15 | -1 | | | | | | st v3, (r3++) | | | | r12 (← p11) |

Fig.6B

| Cycle | Offset | Iteration 0 Instruction | Iteration 1 Instruction | Iteration 2 Instruction | Iteration 3 Instruction |
|---|---|---|---|---|---|
| 0 | 6 | ld r4, (r0++) | | | |
| 1 | 6 | | | | |
| 2 | 5 | mul r6, r5, r1 | ld r4, (r0++) | | |
| 3 | 5 | ld r8, (r2++) | | | |
| 4 | 4 | | mul r6, r5, r1 | ld r4, (r0++) | |
| 5 | 4 | add r10, r7, r9 | ld r8, (r2++) | | |
| 6 | 3 | | | mul r6, r5, r1 | ld r4, (r0++) |
| 7 | 3 | | add r10, r7, r9 | ld r8, (r2++) | |
| 8 | 2 | | | | mul r6, r5, r1 |
| 9 | 2 | st r14, (r3++) | | add r10, r7, r9 | ld r8, (r2++) |
| 10 | 1 | | | | |
| 11 | 1 | | st r12, (r3++) | | add r10, r7, r9 |
| 12 | 0 | | | | |
| 13 | 0 | | | st r12, (r3++) | |
| 14 | -1 | | | | |
| 15 | -1 | | | | st r12, (r3++) |

Fig.7

| Cycle | Offset | Iteration 0 Instruction | Iteration 1 Instruction | Iteration 2 Instruction | Iteration 3 Instruction |
|---|---|---|---|---|---|
| 0 | 6 | ld p10, (p0++) | | | |
| 1 | 6 | | | | |
| 2 | 5 | mul p11, p10, p1 | ld p9, (p0++) | | |
| 3 | 5 | ld p13, (p2++) | | | |
| 4 | 4 | | mul p10, p9, p1 | ld p8, (p0++) | |
| 5 | 4 | add p14, p11, p13 | ld p12, (p2++) | | |
| 6 | 3 | | | mul p9, p8, p1 | ld p7, (p0++) |
| 7 | 3 | | add p13, p10, p12 | ld p11, (p2++) | |
| 8 | 2 | | | | mul p8, p7, p1 |
| 9 | 2 | st p14, (p3++) | | add p12, p9, p11 | ld p10, (p2++) |
| 10 | 1 | | | | |
| 11 | 1 | | st p13, (p3++) | | add p11, p8, p10 |
| 12 | 0 | | | | |
| 13 | 0 | | | st p12, (p3++) | |
| 14 | -1 | | | | |
| 15 | -1 | | | | st p11, (p3++) |

Fig.8

|Cycle|Issue slot 1||| Issue slot 2 ||| Issue slot 3 |||
|---|---|---|---|---|---|---|---|---|---|
||Instruction|Iteration|Stage|Instruction|Iteration|Stage|Instruction|Iteration|Stage|
|0|ld r4, (r0++)|0|1|||||||
|1||||||||||
|2|ld r4, (r0++)|1|1|||||mul r6, r5, r1|0|2|
|3|ld r8, (r2++)|0|2|||||||
|4|ld r4, (r0++)|2|1|||||mul r6, r5, r1|1|2|
|5|ld r8, (r2++)|1|2|||||add r10, r7, r9|0|3|
|6|ld r4, (r0++)|3|1|||||mul r6, r5, r1|2|2|
|7|ld r8, (r2++)|2|2|||||add r10, r7, r9|1|3|
|8|||||||||||
|9|ld r8, (r2++)|3|2|st r12, (r3++)|0|5|mul r6, r5, r1|3|2|
|10||||||||||
|11|||||st r12, (r3++)|1|5|add r10, r7, r9|2|3|
|12||||||||||
|13|||||st r12, (r3++)|2|5|add r10, r7, r9|3|3|
|14||||||||||
|15|||||st r12, (r3++)|3|5||||

Fig.9

PREDICATED EXECUTION OF INSTRUCTIONS IN PROCESSORS

BACKGROUND OF THE INVENTION

1. Field of the Invention

The present invention relates to predicated execution of instructions in processors. In particular, the present invention relates to flexible instruction sequencing and loop control in pipelined loops in, for example, a microprocessor.

2. Description of the Related Art

In high performance computing, the requirement for predicated execution of instructions arises in the context of software-pipelined loops, where a high rate of instruction execution is usually required of the target machine (e.g. microprocessor). Execution time is often dominated by loop structures within the application program. To permit a high rate of instruction execution a processor may include a plurality of individual execution units, with each individual unit being capable of executing one or more instructions in parallel with the execution of instructions by the other execution units.

Such a plurality of execution units can be used to provide a so-called software pipeline made up of a plurality of individual stages. Each software pipeline stage has no fixed physical correspondence to particular execution units. Rather, when a loop structure in an application program is compiled the machine instructions which make up an individual iteration of the loop are scheduled for execution by the different execution units in accordance with a software pipeline schedule. This schedule is divided up into successive stages and the instructions are scheduled in such a way as to permit a plurality of iterations to be carried out in overlapping manner by the different execution units with a selected loop initiation interval between the initiations of successive iterations. Thus, when a first stage of an iteration i terminates and that iteration enters a second stage, execution of the next iteration i+1 is initiated in a first stage of the iteration i+1. Thus, instructions in the first stage of iteration i+1 are executed in parallel with execution of instructions in the second stage of iteration i.

In such software-pipelined loops there are typically several iterations of a loop in a partial state of completion at each moment. Hence, each execution unit may be handling instructions from different iterations from one cycle to the next, and at any one time, the execution units may be processing respective instructions from different iterations. There may also be several live copies of each value computed within each loop. To distinguish between these values, and to identify them relative to the current iteration, requires that the name of each value held in a register must change at well-defined moments during loop execution. These renaming points are known by the compiler, which also determines the register name required within each instruction to access each value depending on the iteration in which it was computed.

With such a software-pipelined scheme, at certain points during execution of the software-pipelined loop there may be a new iteration starting at regular intervals. At other times there may be certain iterations starting as well as other iterations ending at regular intervals, and at other times there may only be iterations which are reaching completion. This scheme, where several overlapping software-pipelined loops are being executed in parallel by several execution units, requires careful control of the starting up and shutting down of these software-pipelined loops. Such control must occur at run-time and it is therefore important that the control mechanisms set up to ensure efficient and correct operation must not place too great a time demand on the processor in an already highly time-critical activity. It is therefore desirable that the time taken to control the sequencing of instructions in software-pipelined loops is as small as possible.

BRIEF SUMMARY OF THE INVENTION

A processor embodying a first aspect of the present invention can execute instructions on a predicated basis. The processor has a series of predicate registers, each switchable between at least respective first and second states and each assignable to one or more predicated-execution instructions. A control information holding unit holds items of control information corresponding respectively to the series of said predicate registers. The processor also has a plurality of operating units corresponding respectively to the predicate registers. Each operating unit has a first control input connected to the said control information holding unit for receiving the control-information item corresponding to its unit's own corresponding predicate register, and also has a second control input connected for receiving the control-information item corresponding to a further one of the said predicate registers. Each operating unit can perform a state determining operation in which the said state of its own predicate register is determined in dependence upon the received control-information items. The plurality of operating units can operate in parallel with one another to perform respective such state determining operations.

A processor embodying a second aspect of the present invention can also execute instructions on a predicated basis. This processor has a series of predicate registers, each switchable between at least respective first and second states and each assignable to one or more predicated-execution instructions. A shifting register designating unit designates one or more of the series of predicate registers as respective shifting registers. A shifter is connected with the predicate registers for carrying out a shift operation in which, for the or each predicate register designated by the shifting register designating unit as such a shifting register, the state of the preceding register of the series is transferred into the register concerned. No such transfer is carried out into any register of the said series not designated as such a shifting register.

BRIEF DESCRIPTION OF THE DRAWINGS

FIG. 4 is a table showing an instruction schedule obeying the modulo scheduling constraint;

FIGS. 6A and 6B show a table illustrating the relationship between virtual, logical and physical register numbers for several iterations of a loop;

FIG. 7 shows an example sequence of compiled instructions for several iterations of a loop;

FIG. 8 shows an example of the sequences of FIG. 7 after run-time mapping of logical registers to physical registers;

FIG. 9 shows the example sequence of FIG. 7 divided according to issue slot;

DETAILED DESCRIPTION OF THE PREFERRED EMBODIMENTS

Figure 1:
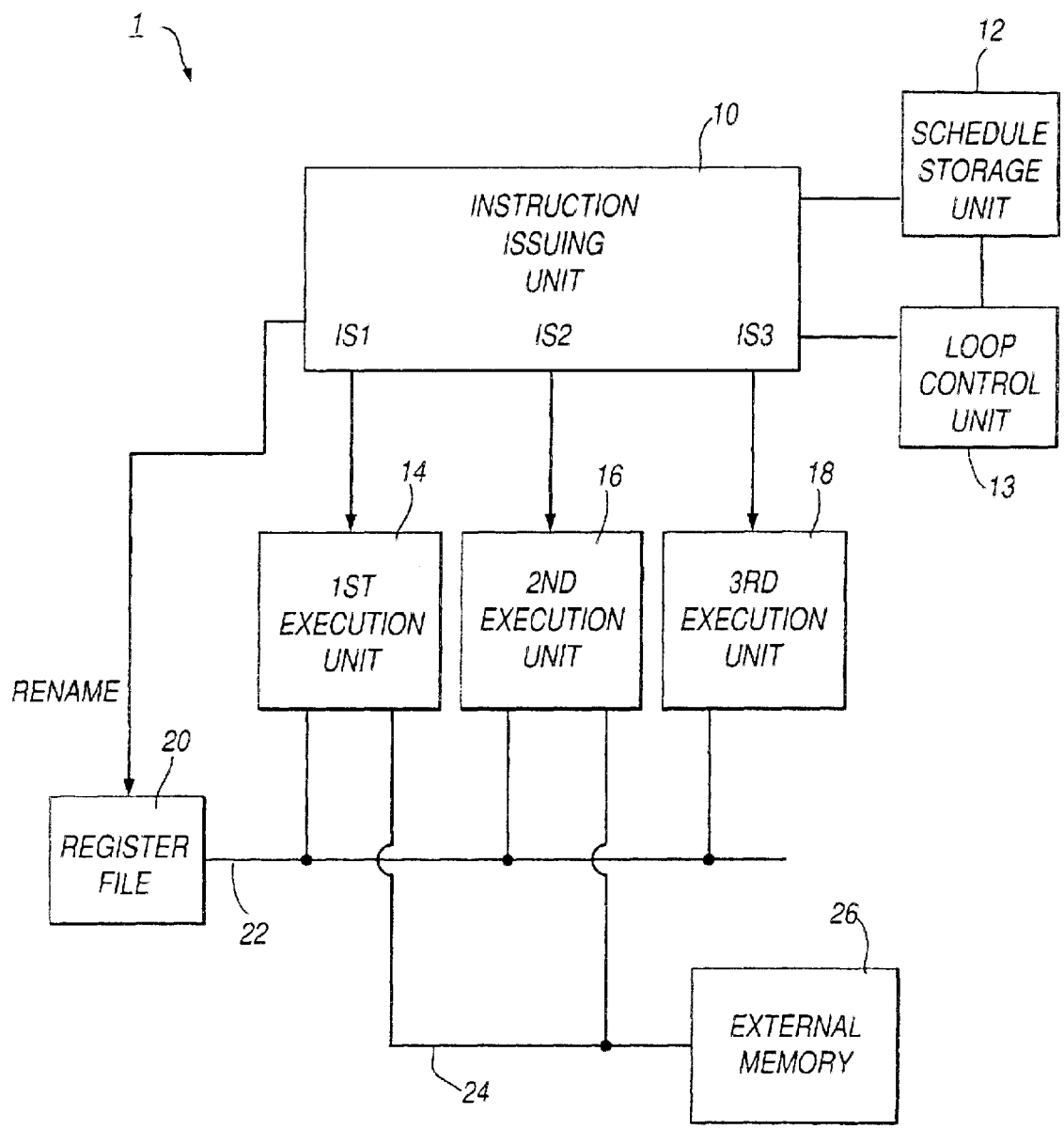
FIG. 1 shows parts of a processor embodying the present invention.

FIG. 1 shows parts of a processor embodying the present invention. In this example, the processor is a very long instruction word (VLIW) processor with hardware support for software pipelining and cyclic register renaming. The processor 1 includes an instruction issuing unit 10, a schedule storage unit 12, a loop control unit 13, respective first, second and third execution units 14, 16 and 18, and a register file 20. The instruction issuing unit 10 has three issue slots IS1, IS2 and IS3 connected respectively to the first, second and third execution units 14, 16 and 18. A first bus 22 connects all three execution units 14, 16 and 18 to the register file 20. A second bus 24 connects the first and second units 14 and 16 (but not the third execution unit 18 in this example) to a memory 26 which, in this example, is an external random access memory (RAM) device. The memory 26 could alternatively be a RAM internal to the processor 1.

Incidentally, although FIG. 1 shows shared buses 22 and 24 connecting the execution units to the register file 20 and memory 26, it will be appreciated that alternatively each execution unit could have its own independent connection to the register file and memory.

The processor 1 performs a series of processing cycles. In each processing cycle the instruction issuing unit 10 can issue one instruction at each of the issue slots IS1 to IS3. The instructions are issued according to a software pipeline schedule (described below) stored in the schedule storage unit 12.

The loop control unit 13 will be described in detail below in relation to the task of controlling the setting up and shutting down of a loop. First will be described the general concept and operation of software pipelined loops in relation to the processor of FIG. 1.

The instructions issued by the instructing issuing unit 10 at the different issue slots are executed by the corresponding execution units 14, 16 and 18. In this example each of the execution units can execute more than one instruction at the same time, so that execution of a new instruction can be initiated prior to completion of execution of a previous instruction issued to the execution unit concerned.

To execute instructions, each execution unit 14, 16 and 18 has access to the register file 20 via the first bus 22. Values held in registers contained in the register file 20 can therefore be read and written by the execution units 14, 16 and 18. Also, the first and second execution units 14 and 16 have access via the second bus 24 to the external memory 26 so as to enable values stored in memory locations of the external memory 26 to be read and written as well. The third execution unit 18 does not have access to the external memory 26 and so can only manipulate values contained in the register file 20 in this example.

The concepts of instruction sequencing and register renaming can be illustrated with reference to the FIG. 1 processor by considering the following simple loop, written in the C programming language, which is commonly found in many linear algebra packages:

$$\text{for } (i = 0; \ i < m; i++)$$
$$dy(i) = dy(i) + da \times dx(i)$$

In this loop, each element dy(i) (i=0, 1, ... m−1) of an array dy is increased by the product of a constant value da and a corresponding element dx(i) of a further array dx.

Figure 2:
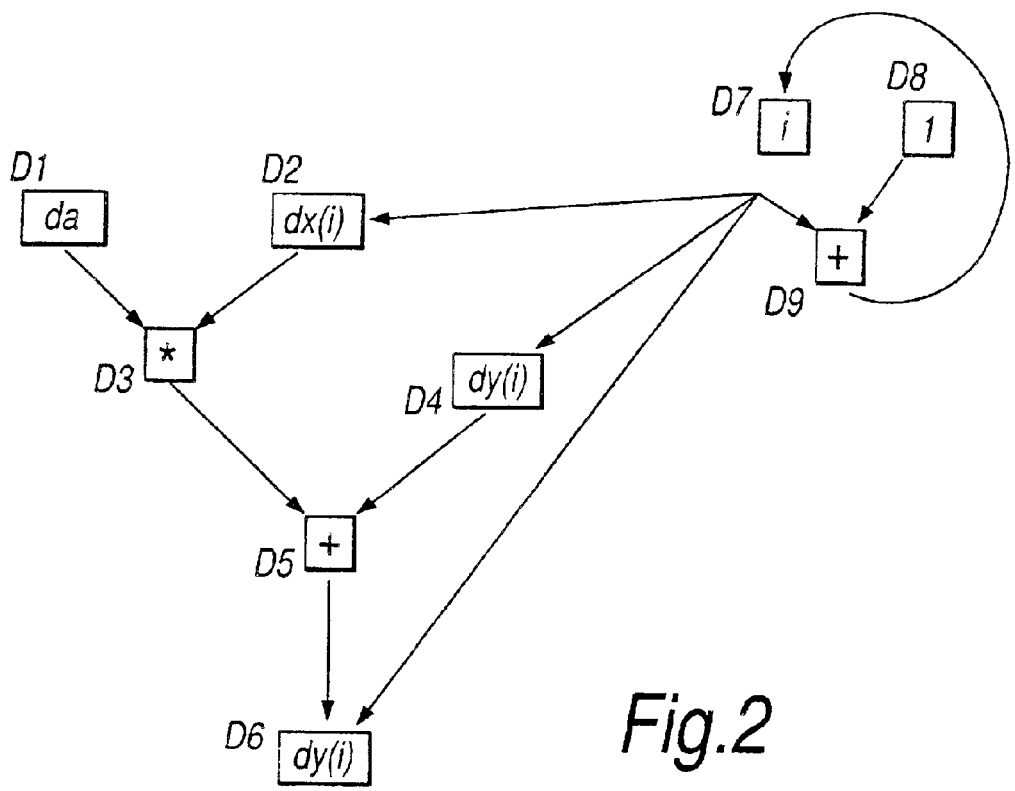
FIG. 2 is an illustration of an example symbolic data-flow graph for a simple instruction loop.

The process of compiling this loop for a very long instruction word (VLIW) processor with hardware support for software pipelining and cyclic register renaming typically begins with the creation of a symbolic data-flow graph, as illustrated in FIG. 2.

The symbolic data-flow graph shows how data, and operators which act upon that data, are utilized during the loop, and is useful for highlighting the time-dependencies within a loop and for determining any time optimizations which can be made to increase the time efficiency of a loop.

For example, the "add" operation in node D5 first requires the value of dy(i) to be accessed (node D4) and the values of da and dx(i) to be accessed (nodes D1 and D2 respectively) and multiplied (node D3). It is apparent that the operations (D1, D2, D3) can be performed at the same time, or overlapping with, the operation D4 such that any values required for operation D5 are ready for use by the start of that operation. The result of the "add" operation in node D5 is subsequently stored in dy(i) in node D5. Nodes D7 to D9 implement the incrementing of the array variable "i" at the end of every iteration.

The arrays dx and dy will be stored in memory locations in the external memory 26 (FIG. 1) and so references to them in the FIG. 1 data-flow graph must be converted into corresponding memory access operations. Thus, each array dx and dy needs at least one pointer for pointing to the storage locations in the external memory 26 where the elements of the array are stored. Each such pointer is held in a register of the register file 20.

Although the constant value da could be dealt with using a similar pointer to its location in the memory, as the value is loop-invariant it is more convenient and fast to keep it directly in its own register of the register file 20 during execution of the loop.

The next step in the process of compiling the example loop shown in the code box above would be to perform a variety of optimisations to convert the data-flow graph shown in FIG. 2 into a form which is closer to actual machine instructions. During this process the compiler would typically determine what values change within the loop and what values remain the same. For example, in this case, the value of "da" is not altered at all during the loop. Array references are converted into pointer accesses, and auto-increment addressing modes are used if the target machine supports such a feature.

Figure 3:
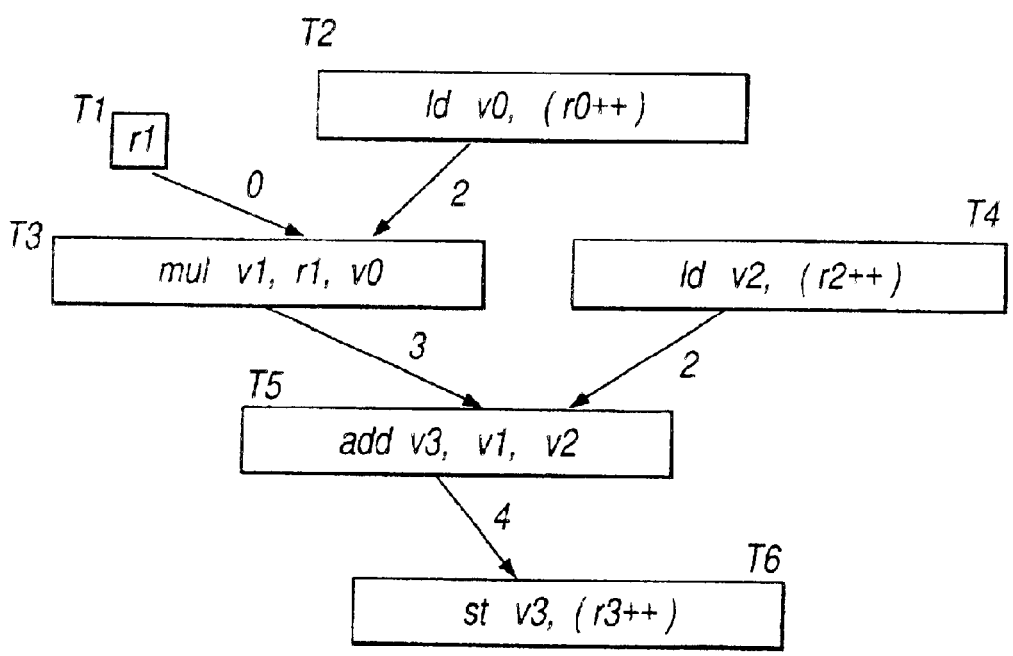
FIG. 3 shows an internal compiler tree-structured representation corresponding to the symbolic data-flow graph of FIG. 2.

The resulting internal tree-structured compiler representation is illustrated in FIG. 3. The illustrated representation shows the individual machine operations T1 to T6, their dependence relationships (as arrows) and attached to each arrow is an integer which represents the number of processor cycles required to complete the operation from which the arrow points.

Listed below is a brief explanation of the meaning of each of the machine operations shown in FIG. 2.

ld A, B: load the contents of memory location B into register A.

mul A, B, C: multiply the contents of register B with the contents of register C and store the result in register A.

add A, B, C: add the contents of register B to the contents of register C and store the result in register A.

st A, B: store the contents of register A in memory location B.

Where a register is shown in brackets in FIG. 3, it is the contents of the memory location pointed to by the address stored in that register which is used. The symbol "++" after a register name means that the contents of that register is auto-incremented after it has been used in a particular operation.

Instructions T1 to T6 illustrated in FIG. 3 relate closely to corresponding nodes D1 to D6 of the symbolic data-flow graph illustrated in FIG. 2. Intermediate values are assigned virtual register numbers (identifiers) v0 to v3, whilst other values are assigned register numbers (identifiers) r1 to r3. The virtual register numbers are not the final register assignments but are merely temporary labels for the arrows in the data-flow graph illustrated in FIG. 2 (as will be explained in more detail below).

Listed below is a summary of the use for each register identifier shown in FIG. 3.

r0: pointer to current dx
r1: da
r2: first pointer to current dy
r3: second pointer to current dy
v0: temporary label for dx
v1: temporary label for da*dx
v2: temporary label for dy
v3: temporary label for dy+da*dx For example, in instruction T2 the contents of the memory location pointed to by register r0 are loaded into register v0 and the value (pointer) stored in register r0 is subsequently incremented. Since the value stored in register r0 is a pointer to the current dx, this represents an access to the value dx(i), which corresponds to node D2 of FIG. 2. Since array references have been converted into pointer accesses, the incrementing of variable i in line 1 of the code box is performed by incrementing the pointer to dx in instruction T2 and the two pointers to dy in instructions T4 and T6.

The longest path between any pair of instructions defines the minimum amount of time required to execute one iteration of the loop. This is known as the "schedule length" and is formally defined as the sum of the latencies along the longest (critical) path plus 1. In this example, therefore, the schedule length is ten cycles. A register which is auto-incremented in one cycle is ready for use again in the next cycle.

All subsequent stages of compilation described here are specific to software pipelining. The first phase of software pipelining is to determine the loop initiation interval (referred to simply as "II"), which is the interval between initiation of successive iterations of the loop. The loop initiation interval depends on the available resources in comparison with the number of instructions to execute, as well as the presence of any cycles in the data-flow graph.

For example, the FIG. 1 processor has three instruction issue slots IS1 to IS3 and three execution units 14, 16 and 18, of which only the first and second execution units 14 and 16 are capable of accessing the external memory 26. It may also be the case that the execution units may be "specialised" units in the sense that they are optimised individually for carrying out different tasks. For example, it may be that only certain of the execution units are capable of performing certain types of instruction.

In the present example, it will be assumed that, taking account of the available resources, the loop initiation interval II is determined as two processor cycles. Also, it will be assumed that only the third execution unit 18 is equipped with the resources (e.g. an arithmetic and logic unit ALU) necessary to execute add and multiply instructions.

The next step is to create a schedule which obeys a so-called modulo scheduling constraint. An example schedule is shown in FIG. 4. Such a schedule is stored in the schedule storage unit 12 of the processor 1 shown in FIG. 1. In the FIG. 4 schedule the first issue slot handles only "ld" instructions, the second issue slot handles only "st" instructions and the third issue slot handles the arithmetic operators "mul" and "add".

The modulo scheduling constraint specifies that, for each issue slot, an instruction can be scheduled at time i if and only if there are no instructions scheduled at time j such that j modulo II is equal to i. This ensures that, with a new iteration starting every II cycles, there is no possibility that more than one instruction is required to be issued from a particular issue slot in a particular cycle.

The modulo scheduling table shows how the five instructions T2 to T6 making up one iteration of the loop are scheduled. In particular, columns 3 to 5 of the table show the cycle in the schedule when each instruction is issued, the software pipeline stage in which it occurs, and the issue slot by which the instruction is issued (i.e. the execution unit which executes the instruction). The final four columns indicate logical register numbers and shading is used to illustrate value lifetimes, as will be explained later in detail with reference to FIGS. 6 to 8.

As shown in the table, because of the modulo scheduling constraint no two instructions can be scheduled a multiple of two cycles apart in the same issue slot. Thus, once the first load instruction T2 has been scheduled for issue from issue slot 1 in cycle 0, the next instruction, i.e. the multiply instruction T3 which is to be issued in cycle 2, must be scheduled in a different issue slot from issue slot 1, in this case issue slot 3. Issue slot 3 is chosen because only the third execution unit 18 is capable of executing multiply instructions in this example. Similarly, once the second load instruction T4 has been scheduled for issue in cycle 3 from issue slot 1, the next instruction, i.e. the add instruction T5 which is scheduled for issue in cycle 5, must be issued from a different slot from slot 1, in this case again the slot 3. The fifth instruction, which is the store instruction T6, is required to be issued at cycle 9. Because of the modulo constraint, this cannot be issued in either issue slot 1 or issue slot 3, and must accordingly be assigned to issue slot 2.

It should be understood that the schedule in the FIG. 4 table relates to one iteration only. Every II cycles another iteration is initiated according to the same schedule. Thus, when the current iteration is at stage 1, the immediately-preceding iteration will be at stage 2, the iteration before that will be at stage 3, the iteration before that at stage 4 and the iteration before that at stage 5. The instructions are scheduled for issue by the same issue slots in all iterations, so that each issue slot issues the same instruction every II cycles.

If the target machine has a set of rotating (logical) registers called s0, s1, s2 up to sr, then these may be allocated in place of the virtual registers as shown in the four right-most columns. It is apparent from FIG. 4 that the register allocated to v0 changes from being s0 in stage 1 to s1 in stage 2. This is because the renaming mechanism effectively shifts the register names by one each time a pipeline boundary is crossed and a new iteration is begun. This allows the value of v0 computed in iteration i to be distinguished from the value of v0 computed in iterations i+1 and i−1.

This places a requirement on the hardware which accesses registers to shift the registers at regular intervals. If the binding between a register name and the register contents is fixed, then the shifting could only be achieved by physically copying si to si+1, for all i in the shifting register file range. This would be prohibitively costly, so instead the binding of register names to register locations can be made to rotate when a shift operation is required. The above-mentioned registers s0 to sr are therefore not the final physical register numbers, but are logical register numbers which are converted (mapped) at run-time to physical register numbers.

Many software pipelined loops also require a number of loop-invariant values to be available in registers. A loop-invariant value is a value which is used inside the loop, but which is never re-computed within the loop. An example is the value "da" in the above example loop. Such values must be stored in registers that do not undergo register renaming during loop execution (statically-named registers). The pointers to the arrays dx and dy, although not loop-invariant values, can also be stored in statically-named registers in this example. Consequently, a preferred form of register file for use in this context may have a renamable portion for holding loop-variant values, and a statically-named portion for holding loop-invariant values and other suitable values.

Figure 5:
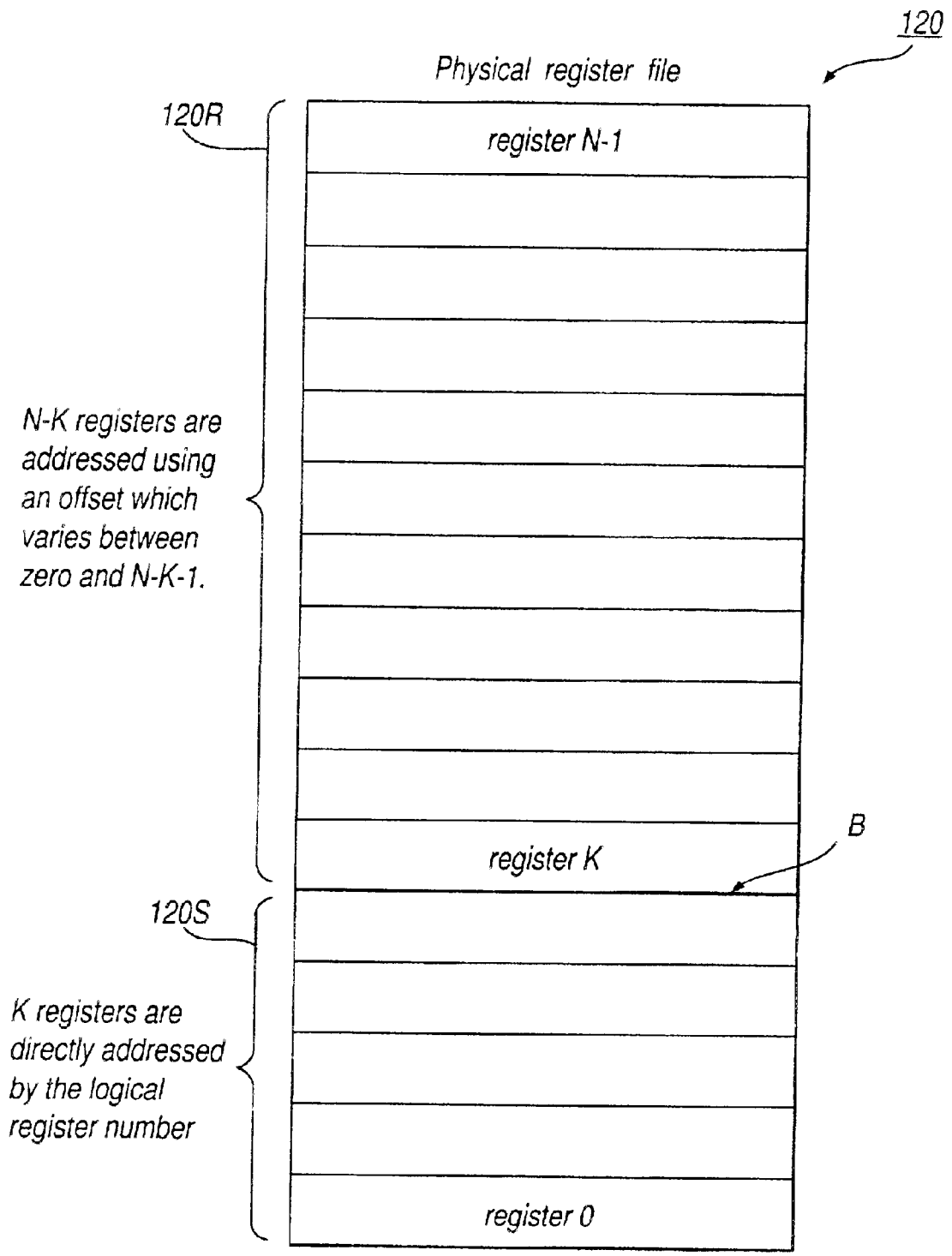
FIG. 5 shows an example register file containing statically and dynamically addressed regions.

One example of such a register file is illustrated in FIG. 5.

The example register file 120 shown in FIG. 5 consists of N registers. Of these, the lower-numbered K are statically named and the higher-numbered N-K are dynamically named (renamable). The statically-named registers make up a statically-named portion 120S of the register file and the renamable registers make up a renamable portion 120R of the register file.

Each instruction specifies its register operands by means of a logical register number. This is an m-bit binary integer in the range 0 to N−1, where m=⌈log₂(N)⌉. The FIG. 5 register file requires mapping circuitry that implements a bijective mapping from logical register identifiers (numbers) to physical register identifiers (addresses). Each physical register address P is also an m-bit binary integer in the range 0 to N−1, and identifies directly one of the actual hardware registers.

If an instruction specifies a logical register number R as one of its operands, and R is in the range 0 to K−1 inclusive, then the physical register number is identical to the logical register number of that operand. However, if R is in the range K to N−1 then the logical register number of that operand is given by P such that:

$$P = K + |R-K+\text{OFFSET}|_{N-K}. \quad (1)$$

In this notation, $|y|_x$ means y modulo x. OFFSET is a mapping offset value (integer) which increases (or decreases) monotonically by one whenever the registers are renamed.

This mapping from logical register number R to physical register number P will now be explained in more detail with reference to the table shown in FIGS. 6A and 6B. The table of FIG. 6B is a continuation of the table shown in FIG. 6A. The table shows the register renaming scheme in operation for the same example as described above, with the first two iterations illustrated in FIG. 6A and the next two iterations illustrated in FIG. 6B.

In this example, the value of K is assumed to be equal to four (since there are four statically-named registers r0 to r3). The value of N is assumed to be sufficiently large that it does not affect the progress of the present example. The mapping offset value OFFSET is initialised to the value 6, and is made to decrease by one every time a pipeline boundary is crossed, as shown in the second column of FIGS. 6A and 6B.

The sequence of instructions shown in the first column of iteration 0 of FIG. 6A is the same as the sequence of instructions shown divided into three columns (issue slots 1 to 3) in FIG. 4. The statically-named registers are assigned logical register numbers r0 to r3. The loop-variant registers are given temporary register numbers (labels) v0 to v3. The same set of temporary labels are used for each iteration, so that the first column of each iteration shows the same sequence of instructions, shifted by the iteration interval II (which in this case is two cycles).

On compilation, the temporary virtual register numbers v0 to v3 are converted into logical register numbers, as shown in the corresponding columns headed v0 to v3 within each iteration illustrated in FIGS. 6A and 6B. For example, the virtual register number v0 in cycles 0 and 1 of iteration 0 is assigned, by the compiler, the logical register number r4. At run-time this logical register number is converted to a physical register number by using equation (1) above to map from R to P. In this case, R=4, K=4 and "offset"=6, and therefore the mapped physical register number will be equal to 10. Hence logical register number r4 is mapped at run-time to physical register number p10 in this example.

When a pipeline boundary is crossed, in order to identify the same register after the boundary is crossed the compiler must use a logical register number that is incremented by one compared to the logical register number used before the crossing, so that at run-time, when the mapping is also rotated at each pipeline boundary, the correct physical register will be accessed from one stage to another. For example, considering the virtual register number v0 in iteration 0, when the pipeline boundary is crossed going from cycle 1 to cycle 2, the logical register number is incremented from r4 to r5, so that the same physical register number (p10) is accessed in the second stage, taking into account the fact that OFFSET has decreased to 5.

FIG. 7 shows the result of the allocation of logical register numbers by the compiler for the sequence of instructions for each of the iterations 0 to 3 shown in FIGS. 6A and 6B. FIG. 8 shows the effect of the register mapping which is performed at run-time to map the logical register numbers to physical register numbers.

It can be seen, by considering the physical register numbers allocated to each of the variables labelled v0 to v3 in the table of FIGS. 6A and 6B, that the values of a variable in one iteration can be distinguished from the value of a variable in a neighbouring iteration, since the physical register allocated to that variable is different from one iteration to the next. Correct operation of the pipelined loop is therefore ensured.

Incidentally, with the above-mentioned mapping equation (1) for the mapping from logical register number R to physical register P, when renaming the rotating registers OFFSET may be incremented or it may be decremented. If it is incremented then the logical register number of a particular physical register decreases by one each time OFFSET is incremented. Likewise if OFFSET is decremented the logical register numbers increase.

Mapping circuitry suitable for performing the above-mentioned mapping is described in our co-pending United Kingdom application no. 0004582.3, the entire content of which is incorporated herein by reference.

FIG. 9 shows the sequence of instructions issued in each of the issue slots IS1 to IS3 of the instruction issuing unit 10 of the processor 1 for the same four iterations described above with reference to FIGS. 6 to 8. The instructions shown in FIG. 9 correspond to those in FIG. 7 using the logical register numbers allocated by the compiler before mapping to the physical register numbers which are shown in FIG. 8. Also shown against each instruction in each issue slot is the iteration and the pipeline schedule stage to which that instruction belongs.

It can be seen from FIG. 9 that, at issue slot 1, during the first II cycles, when the loop is in its initial stage, only the "ld" instruction of iteration 0 is issued. When processing reaches cycle 2 (after the first pipeline stage of iteration 0 has been completed) the first pipeline stage of iteration 1 is begun at the same time as the second pipeline stage of iteration 0. Therefore, from cycles 2 to 7, due to the setting up of the original schedule of FIG. 4, the first execution unit 14 alternates between executing the "ld" instruction from stage 1 of the schedule and executing the "ld" instruction from stage 2 of the schedule, the two "ld" instructions of each pair of successive "ld" instructions being from different respective iterations. This alternating execution continues until cycle 8, when no instruction is issued at issue slot 1 because there is no further iteration after iteration 3 to be executed in this example and the loop is beginning to shut down.

A similar pattern can be seen in issue slot 3 of FIG. 9, where the instructions executed by the third execution unit 18 alternate, from cycles 4 to 9, between the "mul" instruction of stage 2 of the schedule and the "add" instruction of stage 3 of the schedule. During start-up of the loop, between cycles 0 and 3, only one "mul" instruction is issued, in cycle 2. Similarly, during shut-down of the loop, a single "add" instruction is issued in stage 3 (cycles 10 and 11).

Due to the construction of the schedule in this particular example, a single instruction (a "st" instruction) is issued every II cycles in issue slot 2, starting in cycle 9 and ending in cycle 15.

Figures 10, 11:
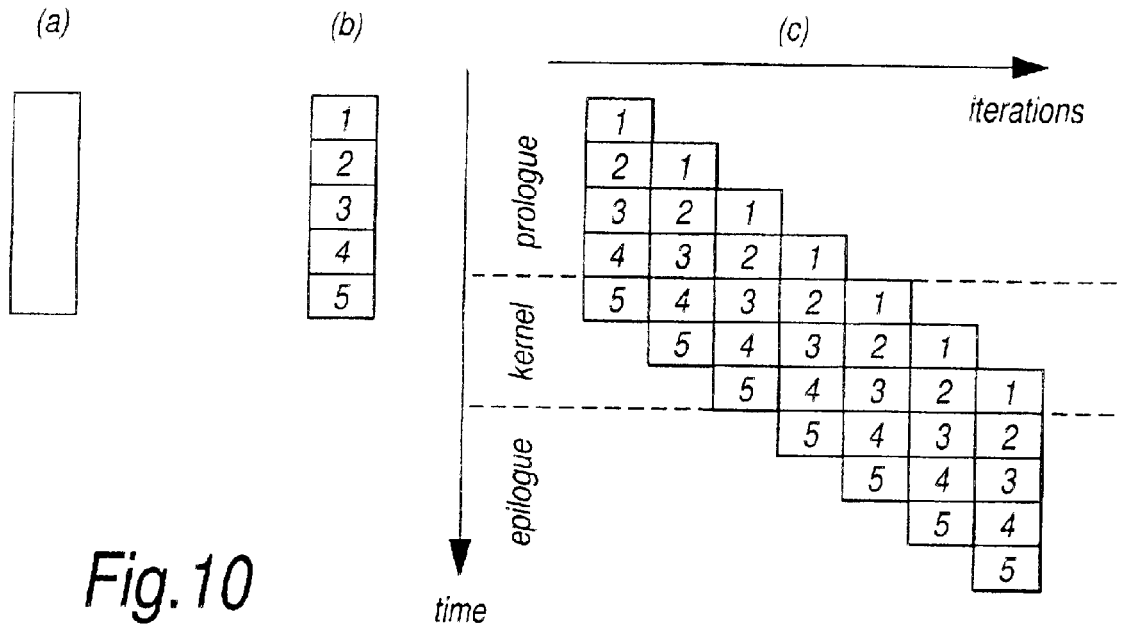
FIG. 10 is a schematic diagram illustrating the different phases of a software-pipelined loop.
FIG. 11 is a diagram illustrating the predicated control of the loop of FIG. 10.

FIG. 10 illustrates a three-stage process from (a) a single sequence of instructions for one iteration of a loop, through (b) creation of a pipelined loop schedule consisting of five stages as described above, to (c) overlapped execution of seven iterations of the pipelined loop. FIG. 10(c) graphically summarises the setting up and shutting down of the loop iterations described above with reference to FIG. 9. As shown in FIG. 10(c), a new iteration is started each time a pipeline boundary is crossed, creating an overlapping stepped structure of iterations from the first iteration through to the last (seventh) iteration.

Execution of these seven overlapped iterations can be divided into three conceptual phases: the "prologue" phase, the "kernel" phase and the "epilogue" phase. The prologue phase consists solely of iterations being initiated, with a new iteration being initiated every II cycles. The kernel phase consists both of iterations being completed and of iterations being initiated, with an iteration being completed every II cycles and a new iteration being initiated every II cycles. Finally, the epilogue phase consists solely of iterations being completed, with an iteration being completed every II cycles.

Controlling the starting up and shutting down of the software pipelined loop as shown in FIGS. 9 and 10 requires the systematic enabling and disabling of pipeline stages at run-time to ensure correct operation of the loop. This task is performed by the loop control unit 13 of the processor 1 shown in FIG. 1.

One possible scheme for controlling iteration initiation and completion will now be described with reference to FIG. 11. The scheme enables pipeline stages to be enabled (during the prologue and kernel phases), and disabled (during the kernel and epilogue phases) in a systematic way. The scheme is useful in any processor which supports predicated execution based on a collection of general-purpose predicate registers. Each predicate register comprises a single bit and can store one state ("true" or "false"). Processors with predicate registers typically use these predicate registers to enable or disable instructions within a software-pipelined loop schedule.

The overlapped iterations (each consisting of five stages) shown in FIG. 11 correspond to those illustrated in FIG. 10. Also illustrated in FIG. 11 is a set of five pipeline stage predicate registers P1 to P5. These predicate registers P1 to P5 correspond respectively to pipeline stages 1 to 5 within the pipelined loop schedule and the respective states stored in the predicate registers can change from one stage to the next during loop execution. These predicate registers are held within the loop control unit 13 of the processor 1.

Each instruction in the software-pipelined schedule is tagged with a predicate number, which is an identifier to one of the predicate registers P1 to P5. For example, in the example of FIG. 11, the instruction(s) in stages 1 to 5 of the pipeline schedule would be tagged with the predicate register identifiers P1 to P5 respectively.

When an instruction is issued by the instruction issuing unit 10, an access is first made to the loop control unit 13 to determine whether the state of the predicate register corresponding to that instruction (as identified by the instruction's tag) is true or false. If the state of the corresponding predicate register is false then the instruction is converted automatically into a NOP instruction. If the corresponding predicate-register state is true, then the instruction is executed as normal.

Therefore, with this scheme all instructions in pipeline stage i are tagged with predicate identifier Pi. For the scheme to operate correctly, it must be arranged, during loop execution, that the state of the predicate register Pi must be true whenever pipeline stage i should be enabled, for all relevant values of i. This provides a mechanism for enabling and disabling stages to control the execution of the loop.

FIG. 11 shows how the predicate-register states for each software pipeline stage change during the execution of the loop. Prior to the start of the loop, each of the predicate registers P1 to P5 is loaded with the state 0 (false state). Prior to initiation of the first iteration, the state 1 (true state) is loaded into the first predicate register P1, thus enabling all instructions contained within the first stage of each of the iterations. All other predicate registers P2 to P5 retain the state 0, so that none of the instructions contained within the second to fifth pipeline stages are executed during the first II cycles.

Prior to the initiation of the second iteration, the state 1 is also loaded into the second predicate register P2, thus enabling all instructions contained within the second stage of the loop schedule. Predicate register P1 still has the state 1, so that instructions contained within the first stage are also executed during the second II cycles. Predicate registers P3 to P5 remain at the state 0, since none of the instructions contained within the third to fifth pipeline stages are yet required.

During the prologue phase, each successive predicate register is changed in turn to the state 1, enabling each pipeline stage in a systematic way until all five predicate registers hold the state 1 and all stages are enabled. This marks the start of the kernel phase, where instructions from all pipeline stages are being executed in different iterations. All the predicate registers have the state 1 during the entirety of the kernel phase.

During the epilogue stage, the pipeline stages must be disabled in a systematic way, starting with stage 1 and ending with stage 5. Therefore, prior to each pipeline stage boundary, the state 0 is successively loaded in turn into each of the predicate registers P1 to P5, starting with P1. The pipeline stages are therefore disabled in a systematic way, thus ensuring correct shut down of the loop.

A dynamic pattern is clearly visible from the predicate registers shown in FIG. 11, which dynamic pattern can be exploited. One previously-considered scheme makes use of a simple shift register to implement a shifting predicate register file. Each bit in the shift register represents one of the predicate values and the predicate values are stored in the shifting register file.

With such an arrangement, a "1" or "0" is shifted into the right-most register prior to the initiation of each new iteration. Initially, the shifting predicate registers would contain the values 00000. A 1 would then be shifted into the right-hand end of the shifting set of predicates prior to the first iteration and the new value would then 00001. This turns on pipeline stage 1, but leaves stages 2 to 5 disabled during those II cycles. This pattern continues for IC loop iterations (IC=iteration count), which in this case is 7. When IC loops have been initiated the loop enters the epilogue phase and the loop controller begins shifting zeros into the shifting predicate register file prior to each iteration to turn off the pipeline stages in the correct order.

Such a scheme provides a reasonable degree of control of the pipeline stages, and the implementation is potentially simple. However, as described above, the number of pipeline stages in each software pipeline schedule depends upon both the code structure and the available resources (such as the number of instructions that can be issued simultaneously). This therefore requires some degree of flexibility in the choice of which predicate registers are actually allocated to pipeline stage control functions. In addition, as will be evident from the description below, it is advantageous in certain circumstances to have the ability to change and/or access the predicate registers in a flexible manner.

Figure 12:
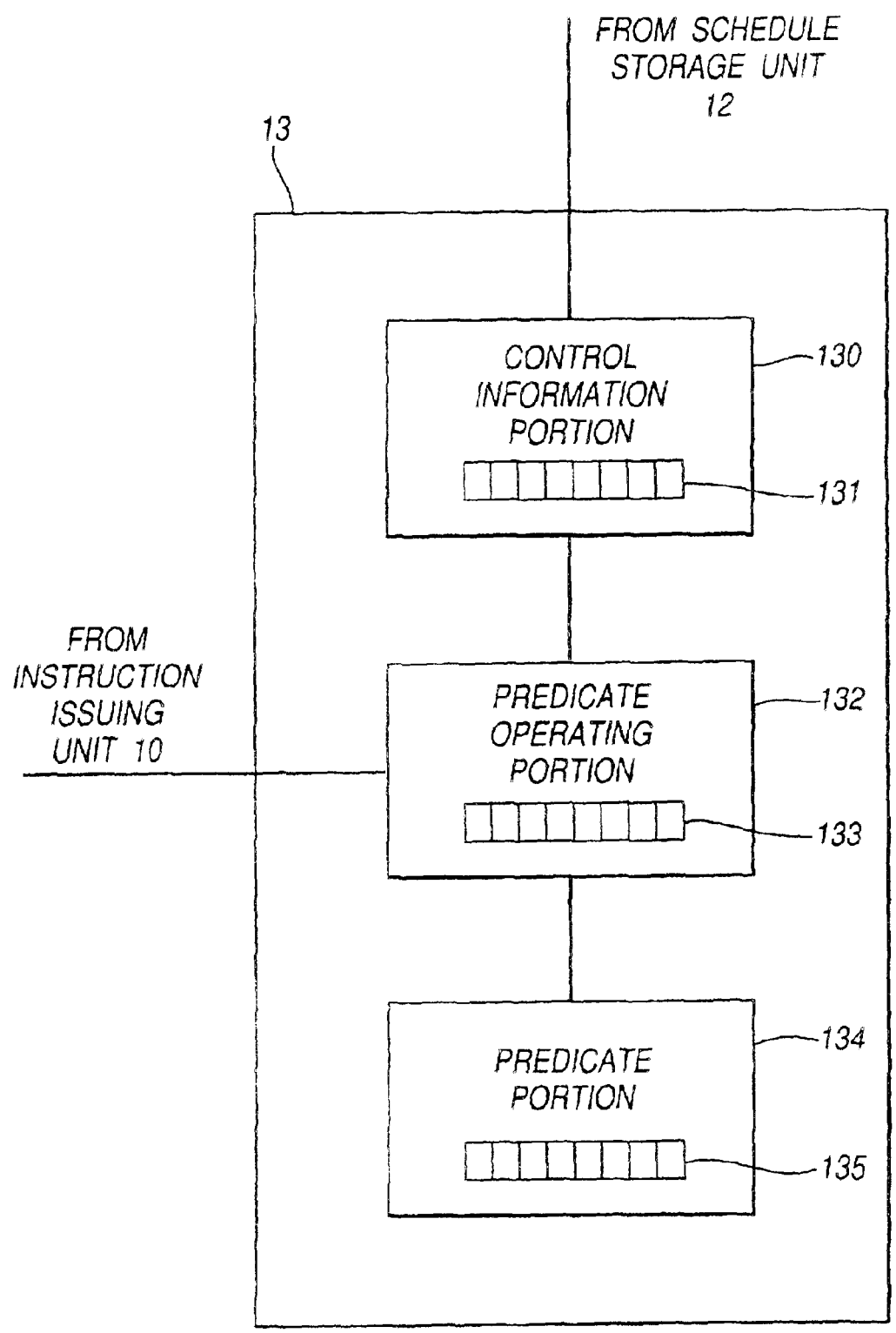
FIG. 12 is a block diagram showing one possible structure of the loop control unit of FIG. 1 in more detail.

FIG. 12 is a block diagram showing parts of a loop control unit 13 for use in a processor according to an embodiment of the present invention. The processor may be the processor 1 shown in FIG. 1. The loop control unit 13 comprises a control information portion 130, a predicate operating portion 132 and a predicate portion 134. The control information portion 130 contains a control information holding unit 131 for holding items of control information, the predicate operating portion 132 contains an operating unit portion 133, and the predicate portion 134 contains a predicate register file 135. The predicate operating portion 132 is in communication with the instruction issuing unit 10 of the processor 1, as well as the control information portion 130 and the predicate portion 134. In addition, the control information portion 130 is in communication with the schedule storage unit 12 of the processor 1.

During execution of a loop, for each instruction for which is to be executed, the instruction issuing unit 10 retrieves the instruction from the schedule storage unit 12 and examines the predicate register identifier which is attached to that instruction (as described above). The instruction issuing unit 10 then requests the predicate operating portion 132 of the loop control unit 13 to determine whether that instruction is to be executed as normal or is to be converted automatically into a NOP operation. The predicate operating portion 132 then accesses the predicate portion 134, which contains a record of the current state of the predicate registers, to determine whether the relevant predicate-register state is true or false. The predicate operating portion 132 then returns this true or false state to the instruction issuing unit 10.

In this embodiment, the initialisation, shifting, loop shut down and termination detection is carried out by the control information portion 130 and predicate operating portion 132 with access to the predicate portion 134. The use of the control information holding unit 131 and the predicate register file 135 will now be described in more detail with reference to FIG. 13. The predicate operating portion 132 will be described in more detail thereafter.

Figure 13:
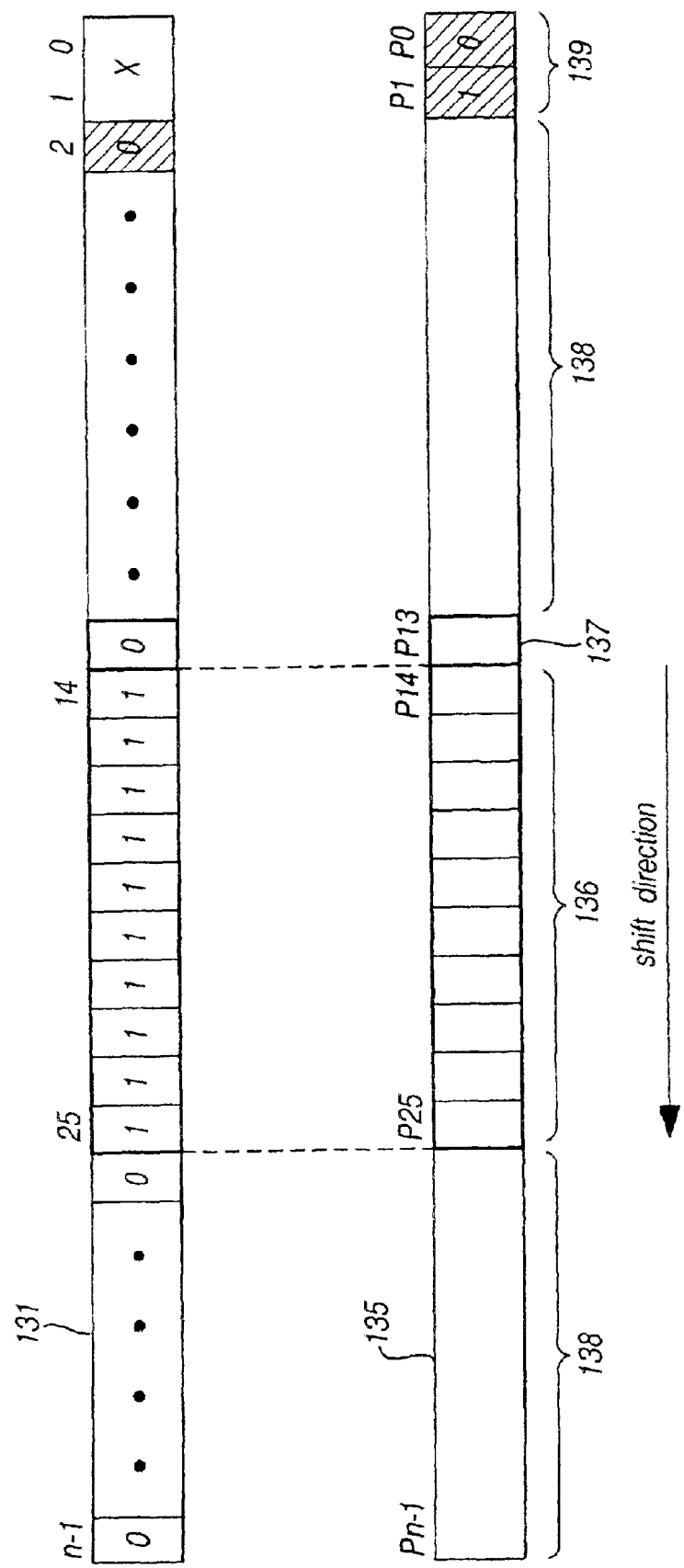
FIG. 13 shows one possible structure of a control information holding unit and a predicate register file.

In FIG. 13, the control information holding unit 131 consists of an n-bit register (referred to hereinafter as a "loop mask" register) which is used for identifying a shifting subset 136 of the n−3 (or fewer) predicate registers (P3 to Pn−1) that are used as shifting predicate registers for loop control purposes. The loop mask register 131 holds n bits (items of control information) which correspond respectively to the n predicate registers in the predicate register file 135.

If the predicate register Pi is to be included in the set 136 of shifting predicate registers, then the corresponding bit i in the loop mask register 131 is set to the value "1". Conversely, if the predicate register Pi is not to be included in the set 136 of shifting predicate registers then the corresponding bit i in the loop mask register 131 is set to the value "0". Typically the loop mask register 131 will contain a single consecutive sequence of ones starting at any position from bit 3 onwards, and of maximum length n−3.

It is preferable that two predicate registers, for example P0 and P1, are set permanently to the two possible states 0 and 1 respectively. These registers are referred to herein as preset registers 139. This is useful when, for example, it is known that a particular instruction is always to be executed. Such an instruction could be tagged with the preset register P1 (known to have the state "1" at all times). Another situation is where it is necessary to initialise a particular predicate register to the state 0, for example. Having preset register P0 permanently set to state 0 allows this initialisation to be performed by a simple copy from P0 into the predicate register concerned.

One additional predicate register, referred to herein as the seed register 137, is used to control the start up and termination of the loop. The preset registers 139 and the seed register 137 cannot therefore be included in the set of shifting registers 136. The remaining predicate registers 138 are unaffected by operations performed on the predicate register file in this example.

The predicate register identifier which is attached to each instruction preferably identifies directly one of the predicate registers within the predicate register file 135. If, for example, there are 32 predicate registers, the predicate register identifier can take the form of a 5-bit field contained within the instruction.

In this example, the identifiers for all instructions in a particular pipeline stage are the same so that all of them are either enabled or disabled according to the corresponding predicate-register value. There can, however, be more than one predicate register associated with a particular stage (for example with if/then/else or comparison instructions).

The relationship between the bits (items of control information) in the loop mask register 131 and the predicate registers in the predicate register file 135 is illustrated in FIG. 13. In this example, bits 14 to 25 of the loop mask register 131 are set to 1, and all other bits are set to 0.

The control information portion 130 also contains circuitry (not shown) which is used for initialising the items of control information in the loop mask register 131. This initialisation is performed in dependence upon information obtained from the schedule storage unit 12 of the processor 1. Such information would include, for example, the number of pipeline stages (and therefore the number of predicates needed for loop control).

The predicate registers P0 to Pn-1 are initialised and changed, during loop execution, in a predetermined way by the predicate operation portion 132 in dependence upon information supplied from the control information portion 130 (with access to the items of control information in the loop mask register 131). These updates to the predicate register file 135 will now be described in more detail.

Prior to the initiation of each successive loop iteration, a shift operation is performed in which the content of each predicate register of the shifting subset is the recipient of the content of the predicate register to its immediate right. The predicate register to the immediate right of the shifting subset (P13 in FIG. 13) is the seed register 137. Thus, in each shift operation the content of the first predicate register (P14) of the shifting register subset 136 is set to the content of the seed register ("the seed").

For example, referring to FIG. 11, during the prologue and kernel phases of loop execution, the seed register 137 would be preset to the state "1" whilst, during the epilogue stage, the seed register 137 would be preset to the state "0" in order to perform loop shut down. When shifting occurs, the seed is copied into the right-most register (P14) but the seed itself remains unaltered.

The four main operations that take place on the predicate register file 135 during loop sequencing are: initialisation, shifting, shutting down and completion detection. The processor 1 will, when appropriate, cause each of these operations to take place. The operations each modify the contents of the predicate register file 135 in specific ways, in dependence upon the items of control information in the loop mask register 131.

The above-described operations are performed in this embodiment by the operating unit portion 133 within the predicate operating portion 132. The operating unit portion 133 will now be described with reference to FIGS. 14 to 16.

Figure 14:
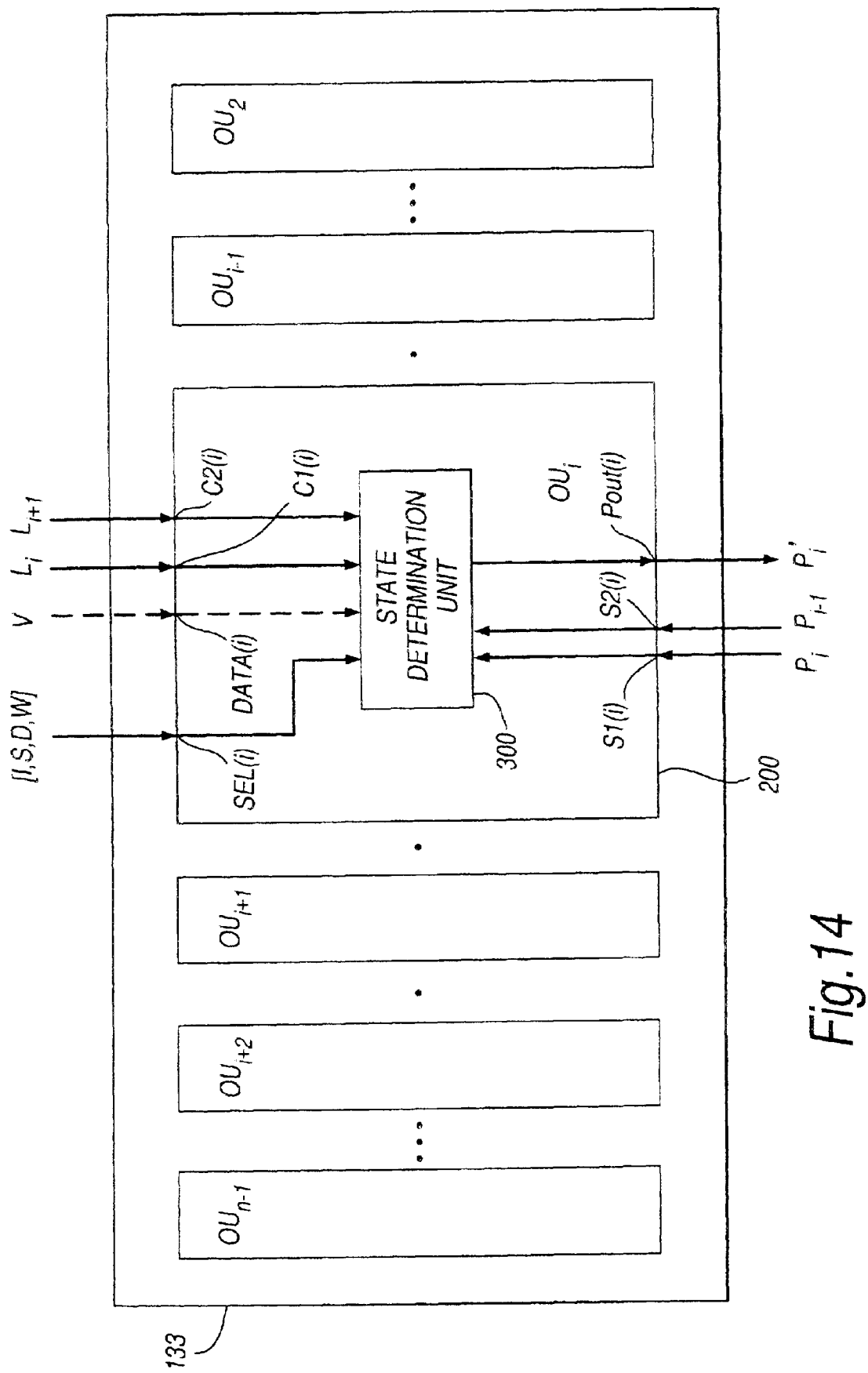
FIG. 14 is a block diagram showing the operating unit portion of FIG. 13 in more detail.

FIG. 14 is a block diagram showing in more detail the operating unit portion 133 of FIG. 12. The operating unit portion 133 contains a plurality of individual operating units $OU_2$ to $OU_{n-1}$ which correspond respectively to the above-described predicate registers P2 to Pn-1 of FIG. 13. Each operating unit contains a state determination unit 300. Each operating unit $OU_i$ has a first control input C1(i) connected for receiving from the control information holding unit (loop mask register) the item $L_i$ of control information which corresponds to its unit's own corresponding predicate register $P_i$. Each operating unit $OU_i$ has a second control input C2(i) connected for receiving from the control information holding unit (loop mask register) a further item of control information, which in this embodiment is the item $L_{i+1}$ that corresponds to the predicate register $P_{i+1}$ immediately following the unit's own corresponding predicate register $P_i$.

Each operating unit also has one or more state inputs, each connected to the predicate register file 135 for receiving an item P of state information indicating the state (content) of a predetermined one of the predicate registers. In this embodiment, each operating unit $OU_i$ has a first state input S1(i), which receives a state-information item for its unit's own corresponding predicate register $P_i$, and a second state input S2(i) which receives a state-information item for the predicate register $P_{i-1}$ immediately preceding the unit's own corresponding predicate register $P_i$.

The state determination unit 300 performs a state determining operation in which the state of its own corresponding predicate register $P_i$ is determined in dependence upon the received control-information items and the one or more received state-information items. The new state $P_i'$ which is determined is made available at an output Pout(i). It is preferable that the operating units $OU_2$ to $OU_{n-1}$ operate in parallel with one another to perform respective such state determining operations.

Each operating unit may be operable to perform more than one state determining operation. This can be achieved by each operating unit having more than one such state determination unit 300, each capable of performing a different state determining operation. Alternatively, each operating unit may be provided with a state determination unit 300 operable selectively to carry out more than one state determination operations. In such a case, the operating unit is preferably provided with a selection input SEL(i), at which one or more selection signals used to determine the kind of the state determining operation to be performed by the operating unit are received. In this embodiment the state determining operations which can be selected include the above-described initialisation, shifting and shutting down operations [I, S, D]. The completion detection operation is not one of the available state determining operations in this embodiment because it does not involve determining the state of any predicate register. Nonetheless, if desired the operating units may be designed in another embodiment to carry out the completion detection operation.

Before describing one possible embodiment of a state determination unit 300, the above-described four operations will now be described in turn with reference to the loop mask register 131 and the predicate register file 135 described above in relation to FIG. 13.

Initialisation of the predicate register file 135 prior to the start of a software-pipelined loop can be achieved by performing the following logical operations, represented by pseudo-code:

for all i from 2 to n-1:

$$P_i' = \bar{L}_i \text{ AND } (P_i \text{ OR } L_{i+1})$$

These logical operations cause each predicate register within the shifting register subset 136 of the predicate register file 137 to be reset to the state 0 (since $\bar{L}_i=0$ for those registers). All other predicate registers except for the seed register are unaffected (because $\bar{L}_i$ AND $P_i=P_i$). The seed register 137, if not already set to the state 1, is set to the state 1 (because $L_i=0$ and $L_{i+1}=1$, so $P_i'=1$). The seed register 137 is set to the state 1 in readiness for the start of the loop, where it will be required for ones to be shifted sequentially into the shifting register subset 136 from the right-hand end thereof.

Prior to the start of each iteration the states of the predicate registers within the shifting register subset 136 must be shifted one register to the left. This involves a selective copying from $P_{i-1}$ to $P_i$ for all predicate registers $P_i$ for which the corresponding loop mask bit $L_i$ is set. This can be expressed by the following pseudo-code:

for all i from 2 to n−1:

$$P_i' = (\overline{L_i} \text{ AND } P_i) \text{ OR } (L_i \text{ AND } P_{i-1})$$

The logical expression $\overline{L_i}$ AND $P_i$ contained within the first pair of brackets simply causes the existing state of $P_i$ to be retained if the value stored in $L_i$ is the value 0. The logical expression $L_i$ AND $P_{i-1}$ contained within the second pair of brackets causes the state stored in $P_{i-1}$ to be copied into $P_i$ if the value stored in $L_i$ is the value 1 (i.e. if the register $P_i$ is contained within the shifting register subset 136). In this way, for the example shown in FIG. 13, the respective states stored in the seed register P13 and in the shifting registers P14 to P24 are shifted one register to the left. The state of the seed register 137 is left unaffected, and the existing state of the register P25 at the left-hand end of the shifting register subset is discarded (overwritten). The state of the predicate register P26 is unaffected.

To initiate loop shut-down, the seed register 137 must first be cleared. The location of the seed register 137 can be determined by observing the pattern of bits in the loop mask register 131 to locate a pair of successive bits of the loop mask register 131 for which $L_i$ is 0 and $L_{i+1}$ is 1. This action of clearing the seed register can be represented by the following pseudo-code:

for all i from 2 to n−1:

$$P_i' = P_i \text{ AND } (L_i \text{ OR } \overline{L_{i+1}})$$

In addition to the three state determining operations described above it is preferable to be able to target specific predicate registers as the destination register for comparison operations which yield one or more boolean results. Hence, a facility for setting either a state 0 or a state 1 into an individual predicate register is also desirable to provide a further state determining operation (writing operation). This can be achieved by providing each operating unit $OU_i$ with a data input DATA(i) for receiving a data signal V and by using a further selection signal W (write-enable) which is applied to the selection input(s) SEL(i).

Circuitry for performing the full set of four state determining operations described above can be implemented using standard logic design techniques to yield a finite state machine for use as the state determination unit 300 in each operating unit OU. The inputs to the computation of the next state for $P_i$ will be a set of selection signals I, S, D, W to select one of the four available state determining operations, two control-information items $L_i$ and $L_{i+1}$, two state-information items indicating the existing states of the predicate registers $P_i$ and $P_{i-1}$, and the data signal D. The logical complexity of this state determination unit can be as little as three stages of logic gates.

Figure 15:
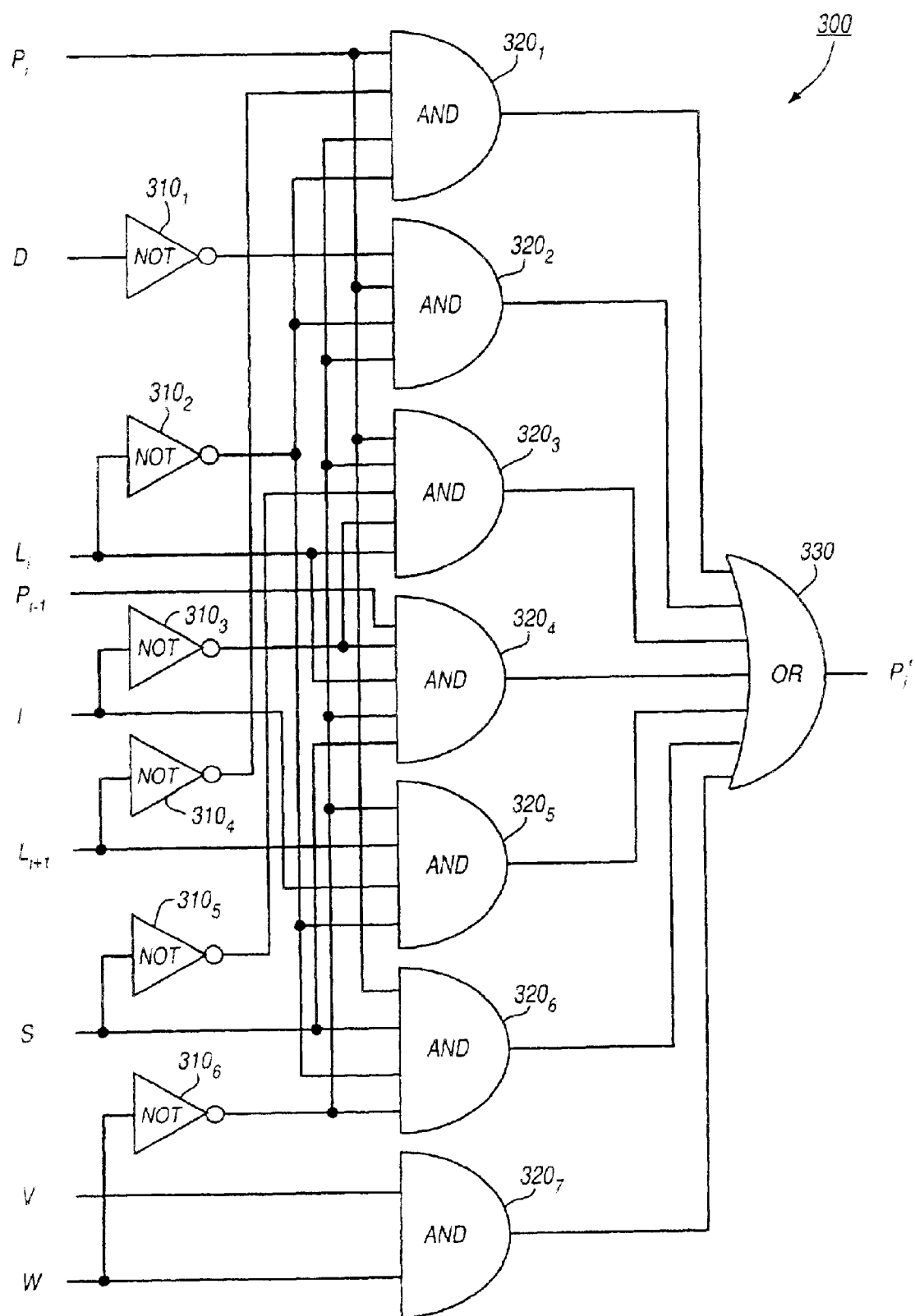
FIG. 15 shows a possible implementation of a state determination unit of FIG. 14.

One example of the implementation of the state determination unit 300 in the present embodiment is shown in FIG. 15. The state determination circuitry 300 comprises six inverters (NOT gates) $310_1$ to $310_6$, seven AND gates $320_1$ to $320_7$ and one OR gate 330.

The first inverter $310_1$ receives at its input the shutting down selection signal D, and its output is connected to one input of the second AND gate $320_2$. The second inverter $310_2$ receives at its input the control-information item $L_i$ and its output is connected to an input of each of the first, second, fifth and sixth AND gates $320_1$, $320_2$, $320_5$ and $320_6$. The third inverter $310_3$ receives at its input the initialisation selection signal I and its output is connected to respective inputs of both the third and fourth AND gates $320_3$ and $320_4$.

The fourth inverter $310_4$ receives at its input the control-information item $L_{i+1}$ and its output is connected to one input of the first AND gate $320_1$. The fifth inverter $310_5$ receives at its input the shifting selection signal S and its output is connected to an input to the third AND gate $320_3$. The sixth inverter $310_6$ receives at its input the selection signal W and its output is connected to an input of each of the first to sixth AND gates $320_1$ to $320_6$.

In addition to the above-described inputs received from the inverters $310_1$ to $310_6$, the AND gates $320_1$ to $320_7$ receive further inputs as follows. The first, second, third and sixth AND gates $320_1$, $320_2$, $320_3$ and $320_6$ each receive as further inputs the state-information item $P_i$. The third AND gate $320_3$ receives as a further input the control-information item $L_i$. The fourth AND gate $320_4$ receives as further inputs the state-information item $P_{i-1}$, the control-information item $L_i$ and the selection signal S. The fifth AND gate $320_5$ receives as an input the selection signal I and receives as a further input the control-information item $L_{i+1}$. The sixth AND gate $320_6$ receives as a further input the selection signal S. The seventh AND gate $320_7$ receives as inputs both the data signal V and the writing selection signal W.

The respective outputs of the seven AND gates $320_1$ to $320_7$ are all connected to respective inputs of the OR gate 330. The new state $P_i'$ for predicate register $P_i$ is obtained at the output of the OR gate 330.

Operation of the state determination circuitry of FIG. 15 will now be described. As mentioned above, the circuitry is operable to perform the following four operations: initialisation, shifting, shutting down and writing.

Figure 16:
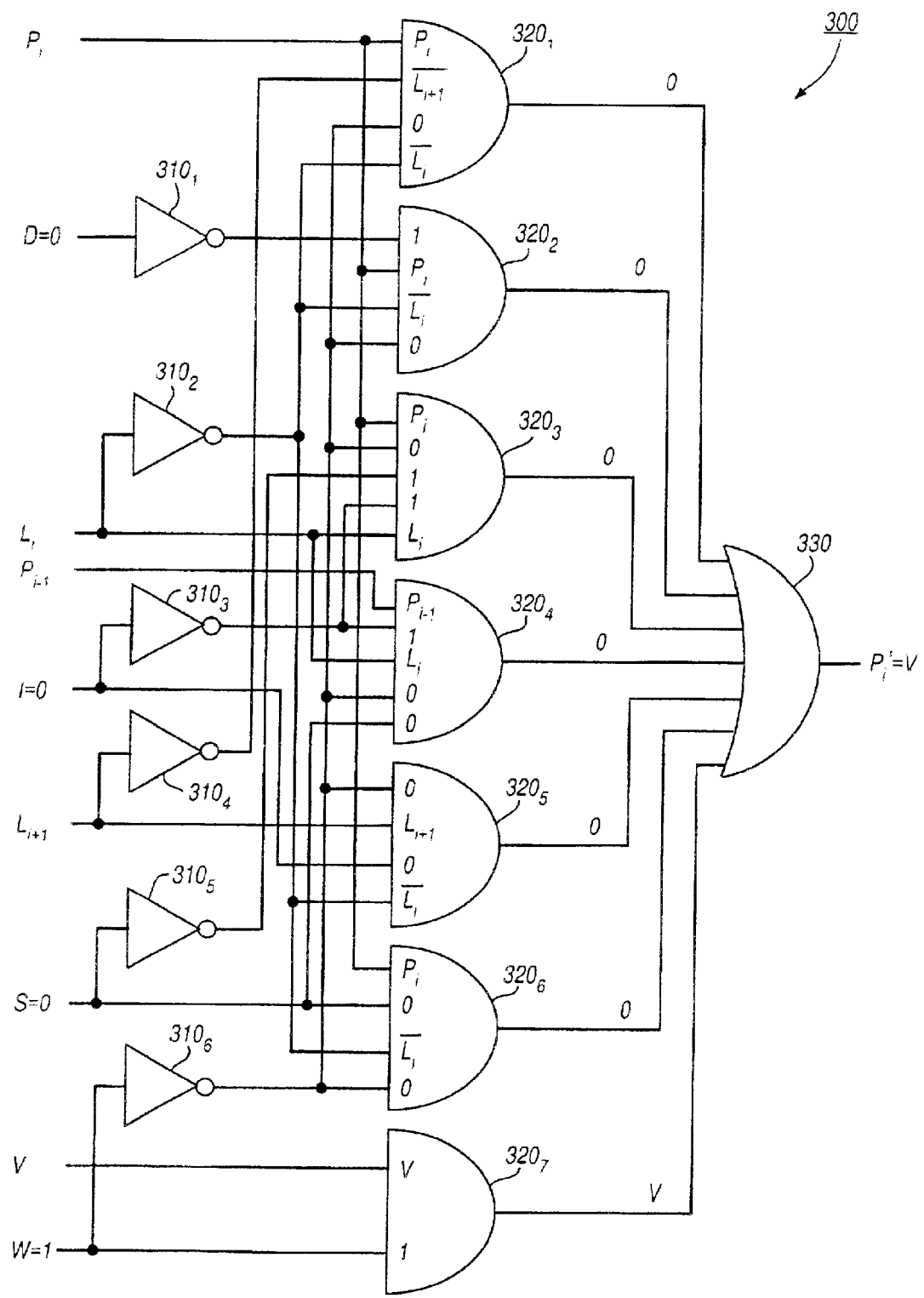
FIG. 16 shows the state determination circuitry of FIG. 15 performing a write operation.

As shown in FIG. 16, when a writing operation is to be performed, the selection signal (write-enable signal) W is set to the value 1 and the data signal V is set to the state which is to be written to predicate register $P_i$. In the FIG. 16 illustration, each of the other three selection signals D, I and S is set to the value 0, although in fact they can take any value since the AND gates to which they are connected are disabled anyway because each of them receives an input $\overline{W}=0$ via the sixth inverter $310_6$. The output of the seventh AND gate $320_7$ is identical to the data signal V, and the new state $P_i'$ output from the OR gate 330 is therefore the data signal V. This new state $P_i'$ for predicate register $P_i$ is then loaded into that predicate register contained within the predicate register file 135 by circuitry (not shown) within the predicate portion 134.

Incidentally although in FIG. 15 each operating unit OU receives its own independent writing selection signal W and its own independent data signal V, it will be appreciated that one or both signals W and V could alternatively be provided in common to all the operating units.

Figure 17:
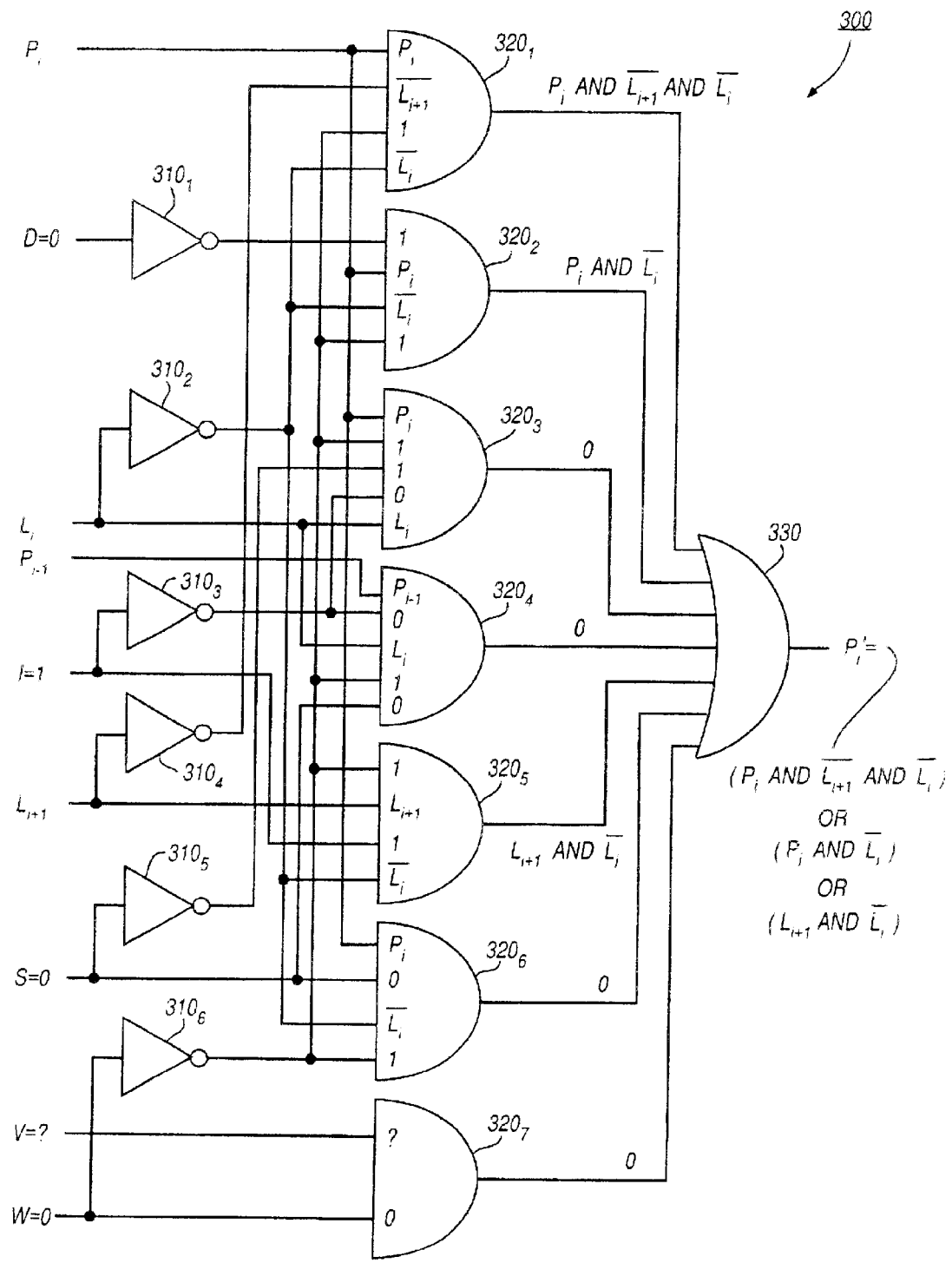
FIG. 17 shows the state determination circuitry of FIG. 15 performing an initialisation operation.

As shown in FIG. 17, when an initialisation operation is to be performed, the initialisation selection signal I is set to the value 1, and each of the three other selection signals D, S and W is set to the value 0. It can be shown that the output $P_i'$ of the OR gate 330 is then given by:

$$P_i' = (P_i \text{ AND } \overline{L_{i+1}} \text{ AND } \overline{L_i}) \text{ OR } (P_i \text{ AND } \overline{L_1})$$

$$\text{OR } (\overline{L_{i+1}} \text{ AND } \overline{L_i})$$

$$= \overline{L_1} \text{ AND } ([P_i \text{ AND } \overline{L_{i+1}}] \text{ OR } P_1 \text{ OR } L_{i+1})$$

$$= \overline{L_1} \text{ AND } (P_1 \text{ OR } L_{i+1})$$

since ([A AND B] OR A)=A. This expression for $P_i'$ is the same as that given above in the description relating to the initialisation operation.

Figure 18:
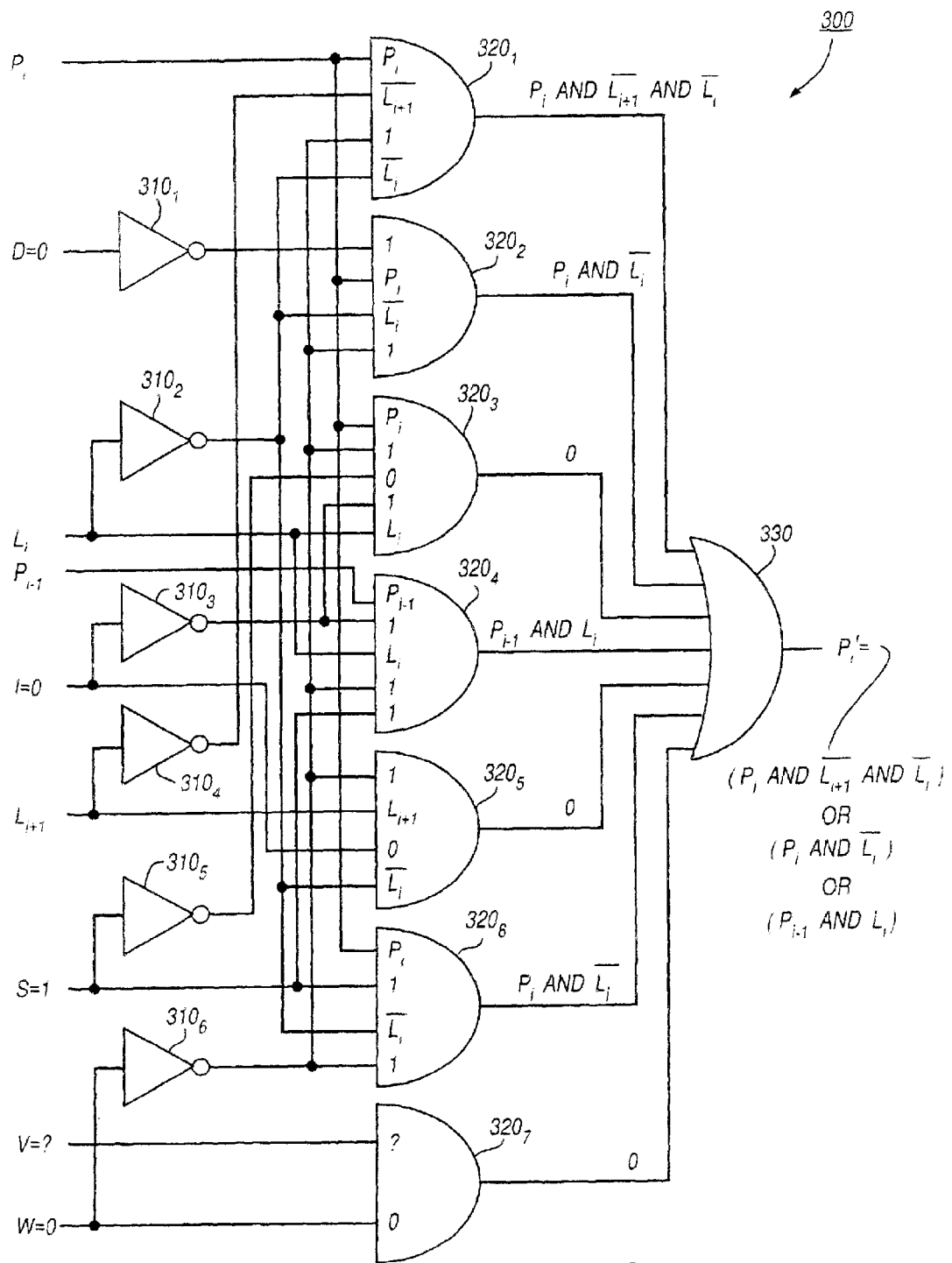
FIG. 18 shows the state determination circuitry of FIG. 15 performing a shifting operation.

As shown in FIG. 18, when a shifting operation is to be performed, the shifting selection signal S is set to the value 1, and each of the three other selection signals D, I and W is set to the value 0. It can be shown that the output $P_i'$ of the OR gate 330 is then given by:

$$P_1' = (P_1 \text{ AND } \overline{L}_{i+1} \text{ AND } \overline{L}_1) \text{ OR } (P_1 \text{ AND } \overline{L}_1)$$
$$\quad \text{OR } (P_{i-1} \text{ AND } L_i)$$
$$= (P_i \text{ AND } \overline{L}_i) \text{ AND } (\overline{L}_{i+1} \text{ OR } 1) \text{ OR } (P_{i-1} \text{ AND } L_1)$$
$$= (P_i \text{ AND } \overline{L}_i) \text{ OR } (P_{i-1} \text{ AND } L_i)$$

This expression for $P_i'$ is the same as that given above in the description relating to the shift operation.

Figure 19:
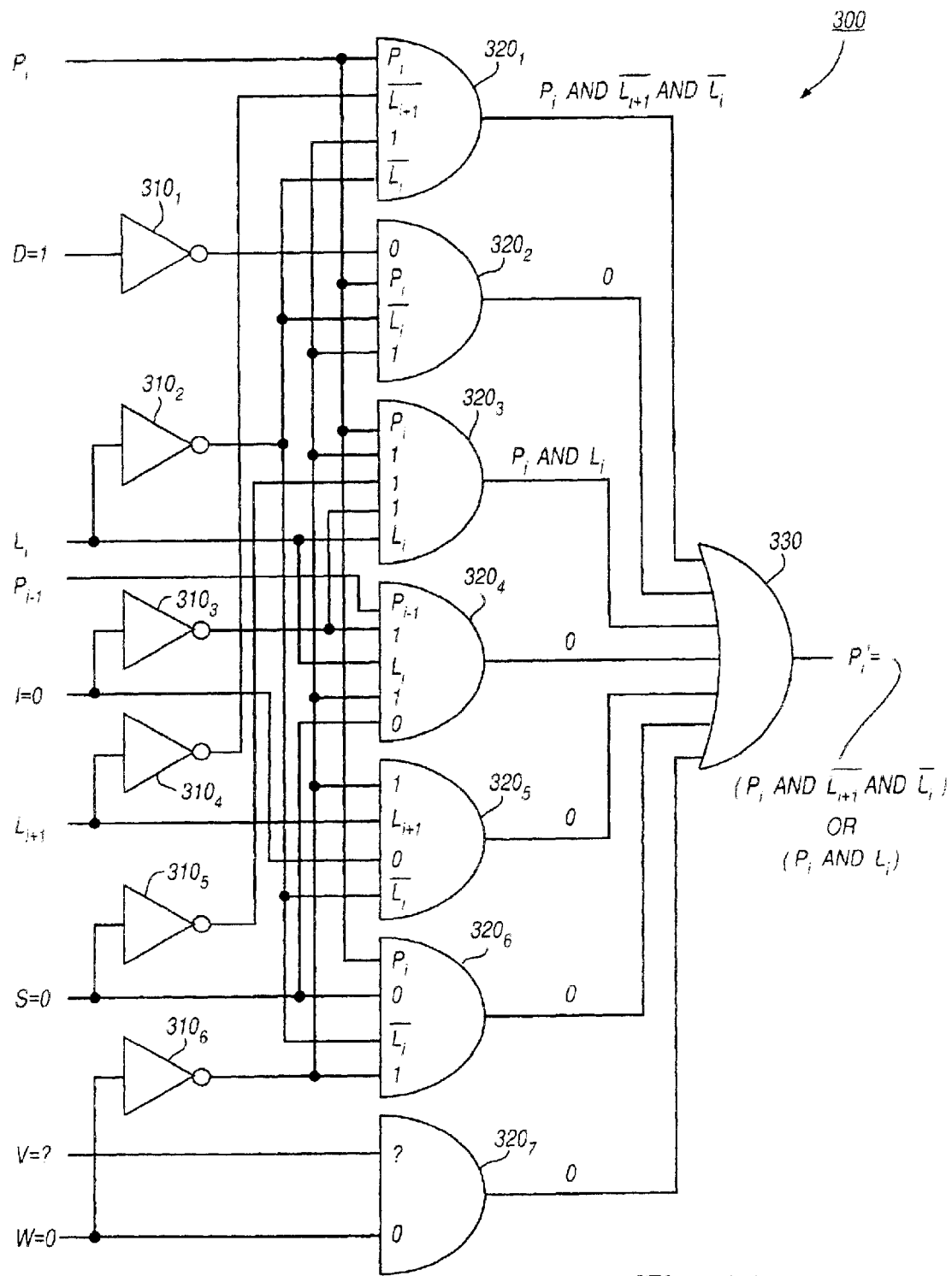
FIG. 19 shows the state determination circuitry of FIG. 15 performing a shutting down operation.

As shown in FIG. 19, when a shutting down operation is to be performed, the shutting down selection signal D is set to the value 1, and each of the three other selection signals I, S and W is set to the value 0. It can be shown that the output $P_i'$ of the OR gate 330 is then given by:

$$P_1' = (P_1 \text{ AND } \overline{L}_{i+1} \text{ AND } \overline{L}_1) \text{ OR } (P_1 \text{ AND } L_i)$$
$$= P_1 \text{ AND } ([\overline{L}_{i+1} \text{ AND } \overline{L}_1) \text{ OR } L_1)$$
$$= P_1 \text{ AND } (\overline{L}_{i+1} \text{ OR } L_i)$$

since ([A AND $\overline{B}$] OR B)=(A OR B). This expression for $P_i'$ is the same as that given above in the description relating to the shutting down operation.

The end of the epilogue phase can be detected (completion detection) by performing an AND operation of the state $P_i$ of each predicate register and the value of the control-information item $L_i$ corresponding to the predicate register concerned, i.e. a bit-wise AND of the loop mask register 131 and the predicate register file 135. If the resulting collection of AND-operation results are all false then the loop has terminated. This test can be represented by the following pseudo-code:

end=0
for all i from 2 to n−1:
$\overline{\text{end}}=\overline{\text{end}}$ OR ($L_i$ AND $P_i$)

If the value of "end" is 0 after this procedure, the end of the epilogue phase has been detected.

Each operating unit $OU_i$ could be provided with a completion detection circuit (e.g. a three-input AND gate receiving as inputs $P_i$, $L_i$ and a further selection signal used to select a completion detection operation) to carry out the AND operation for its corresponding predicate register. The respective AND-operation results would then be output to further completion-detection circuitry (e.g. an n-input NOR gate) which would produce the $\overline{\text{end}}$ signal.

In the present embodiment the operating units are capable of carrying out more than one different kind of state determining operation, but this is not an essential feature of the invention. Similarly, it is not essential that the state determining operations be the particular operations (initialisation, shift, shutting down and writing) described above. The operating units may be designed to carry out any suitable state determining operations in parallel with one another. It is also not essential that the control-information items be used to denote whether or not the corresponding predicate registers belong to a shifting subset. The control-information items can be used for any suitable purpose such as distinguishing generally between the predicate registers.

The control-information items are not restricted to binary values 0 and 1. Each item could be a symbol and have two or more bits, so that more than two values could be represented by each item.

It will be appreciated that in the embodiment described above, the plurality of individual operating units are capable of carrying out respective state determining operations in parallel with one another. In another aspect of the present invention, operating units which operate in parallel with one another are not an essential feature. In this other aspect of the invention, the control-information items are used to designate one or more predicate registers of the predicate register file as respective shifting registers. Then, in a shift operation, for each predicate register designated as such a shifting register, the state of the preceding register is transferred into the register concerned, no such transfer being carried out into any register that is not designated as such a shifting register. In this case, it is not necessary for the shift operation to be carried out by operating units working in parallel with one another. The shift operation could be carried out sequentially for the designated shifting registers.

Circuitry embodying this aspect of the invention may also be capable of carrying out the other kinds of operation mentioned above, for example the initialisation, shutting down and writing operations, but this is not essential. If such operations are available, they also need not be carried out in parallel by different operating units. For example, in the shutting down operation the items of control information in the loop mask register 131 could be examined sequentially to find the location of the seed register.

Furthermore, in this aspect of the invention the loop mask register could be replaced by some other arrangement for flexibly designating which predicate registers of the predicate register file are to be shifting registers. For example, the designating circuitry could be a pair of control registers, one indicating the location of the first predicate register that is designated as a shifting register (e.g. P14 in FIG. 13) and the other control register of the pair indicating the last register (P25) so designated. Alternatively, instead of indicating the last register, the number of registers in the shifting subset could be stored instead. Other variations are possible.

Although the above description relates, by way of example, to a VLIW processor capable of software-pipeline execution, it will be appreciated that the present invention is applicable to processors not having these features. A processor embodying the present invention may be included as a processor "core" in a highly-integrated "system-on-a-chip" (SOC) for use in multimedia applications, network routers, video mobile phones, intelligent automobiles, digital television, voice recognition, 3D games, etc.

I claim:

1. A processor, operable to execute instructions on a predicated basis, comprising:
a series of predicate registers, each switchable between at least respective first and second states and each assignable to one or more predicated-execution instructions;
a control information holding unit which holds items of control information corresponding respectively to said predicate registers of said series; and
a plurality of operating units, corresponding respectively to said predicate registers, each having a first control input connected to said control information holding unit for receiving the control-information item corresponding to the operating unit's own corresponding predicate register and also having a second control input connected for receiving the control-information item corresponding to a further one of said predicate registers, and operable to perform a state determining operation in which said state of its said own predicate register is determined in dependence upon the received control-information items, said operating units of the plurality being operable in parallel with one another to perform respective such state determining operations.

2. A processor as claimed in claim 1, wherein, for each said predicate register other than the last predicate register of said series, said further one of the predicate registers is the register following said own predicate register in said series.

3. A processor as claimed in claim 1, wherein each said operating unit also has at least one state input connected for receiving an item of state information, indicating said state of a predetermined one of said predicate registers of said series, and is operable to set the state of its said own predicate register in dependence also upon said state-information item.

4. A processor as claimed in claim 3, wherein, for each said operating unit, said state-information item indicates said state of the unit's said own predicate register.

5. A processor as claimed in claim 3, wherein each said operating unit has respective first and second such state inputs connected for receiving respective such state-information items, indicating the respective states of two different ones of said predicate registers, and is operable to set the state of its said own predicate register in dependence also upon said state-information items.

6. A processor as claimed in claim 5, wherein, for each said operating unit, said two predicate registers are the unit's said own predicate register and the predicate register that precedes said own predicate register in said series.

7. A processor as claimed in any preceding claim, wherein the items of control information are changeable in use of the processor.

8. A processor as claimed in claim 1, wherein each said operating unit is operable selectively to perform any one of a plurality of different such state determining operations.

9. A processor as claimed in claim 8, wherein each said operating unit has a selection input for receiving one or more selection signals, and said state determining operation to be performed by the operating unit is selected by said one or more selection signals applied thereto.

10. A processor as claimed in claim 1, wherein each said control-information item is changeable between at least first and second values.

11. A processor as claimed in claim 10, wherein the or one said state determining operation is an initialisation operation in which each operating unit sets its said own predicate register to said second state in the event that the control-information item corresponding to that predicate register has said first value.

12. A processor as claimed in claim 11, wherein in said initialisation operation each said operating unit sets its said own predicate register to said first state in the event that the control-information item corresponding to that predicate register has said second value, and that said control-information item corresponding to the predicate register following said own predicate register in said series has said first value.

13. A processor as claimed in claim 10, wherein the or one said state determining operation is a shifting operation in which each designated one of the operating units sets said state of its own predicate register in dependence upon said state of the predicate register that precedes said own predicate register in said series.

14. A processor as claimed in claim 13, wherein each operating unit is designated in said shifting operation in the event that said control-information item corresponding to the unit's said own predicate register has said first value.

15. A processor as claimed in claim 10, wherein the or one said state determining operation is a shutting down operation in which each operating unit sets its said own predicate register to said second state in the event that the control-information item corresponding to that predicate register has said second value, and that said control-information item corresponding to the predicate register following said own predicate register in said series has said first value.

16. A processor as claimed in claim 10, wherein the or one said state determining operation is a writing operation in which each designated one of the operating units sets its said own predicate register to a chosen one of said first and second states.

17. A processor as claimed in claim 16, wherein each operating unit has a data input for receiving a data signal indicating said chosen state.

18. A processor as claimed in claim 10, further comprising a completion detection unit which determines that a predetermined processor operation has been completed when, for every predicate register whose corresponding control-information item has said first value, the predicate register has said second state.

19. A processor as claimed in claim 18, wherein said completion detection unit comprise a plurality of individual completion detection circuits, each operating unit including one of said completion detection circuits of said plurality, and each said completion detection circuit is operable to produce a detection result for its particular operating unit based on said state of that unit's said own corresponding predicate register and on said control-information item corresponding to that predicate register.

20. A processor as claimed in claim 1, wherein each said operating unit includes combinatorial logic circuitry for effecting the or each said state determining operation.

21. A processor, operable to execute instructions on a predicated basis, comprising:
   a series of predicate registers, each switchable between at least respective first and second states and each assignable to one or more predicated-execution instructions;
   a shifting register designating unit which designates one or more predicate registers of said series as respective shifting registers; and
   a shifter connected with said predicate registers for carrying out a shift operation in which, for the or each predicate register designated by the shifting register designating means as such a shifting register, the state of the preceding register of said series is transferred into the register concerned, no such transfer being carried out into any register of said series not designated as such a shifting register.

22. A processor as claimed in claim 21, wherein said shifting register designating unit serves, when the processor is in use, to hold items of designation information corresponding respectively to said predicate registers of said series, each such item indicating whether or not the predicate register to which it corresponds is one of said shifting registers.

23. A processor as claimed in claim 22, wherein said designation-information items are changeable in use of the processor.

* * * * *